United States Patent
Ach et al.

(10) Patent No.: US 10,969,872 B2
(45) Date of Patent: Apr. 6, 2021

(54) GESTURE INTERFACE

(71) Applicant: Rakuten, Inc., Tokyo (JP)

(72) Inventors: Laurent Ach, Paris (FR); Ken Prepin, Paris (FR); Cecilia Lejeune, Paris (FR)

(73) Assignee: Rakuten, Inc., Tokyo (JP)

( * ) Notice: Subject to any disclaimer, the term of this patent is extended or adjusted under 35 U.S.C. 154(b) by 0 days.

(21) Appl. No.: 15/566,780

(22) PCT Filed: Apr. 16, 2015

(86) PCT No.: PCT/JP2015/062316
§ 371 (c)(1),
(2) Date: Oct. 16, 2017

(87) PCT Pub. No.: WO2016/166902
PCT Pub. Date: Oct. 20, 2016

(65) Prior Publication Data
US 2018/0088676 A1 Mar. 29, 2018

(51) Int. Cl.
*G06F 3/01* (2006.01)
*G06F 3/0484* (2013.01)

(52) U.S. Cl.
CPC .............. *G06F 3/017* (2013.01); *G06F 3/011* (2013.01); *G06F 3/012* (2013.01); *G06F 3/013* (2013.01); *G06F 3/04842* (2013.01)

(58) Field of Classification Search
CPC .......... G06F 3/013; G06F 3/012; G06F 3/011; G06F 3/017; G06F 3/04842
See application file for complete search history.

(56) References Cited

U.S. PATENT DOCUMENTS

| | | | |
|---|---|---|---|
| 8,947,351 B1 | 2/2015 | Noble | |
| 10,168,789 B1* | 1/2019 | Soto | ............. G06F 3/017 |
| 2010/0156781 A1* | 6/2010 | Fahn | ............. H04M 1/72544 |
| | | | 345/156 |
| 2012/0206333 A1 | 8/2012 | Kim | |

(Continued)

FOREIGN PATENT DOCUMENTS

| | | |
|---|---|---|
| JP | 2002-259989 A | 9/2002 |
| JP | 2014-137818 A | 7/2014 |

OTHER PUBLICATIONS

Chatterjee, I., Harrison, C., (2015) Gaze+Gestire: Expressive, Precise and Targeted Free-Space Interactions.*

(Continued)

*Primary Examiner* — Justin R. Blaufeld
*Assistant Examiner* — David Tan
(74) *Attorney, Agent, or Firm* — Sughrue Mion, PLLC

(57) ABSTRACT

A user interface apparatus, computer program, computer readable medium, and method for selecting a selectable object on a display screen is presented. The display screen displays one or more selectable objects. Information regarding a tracked hand position, and a tracked head or eye position of the user are obtained. Based on the tracked hand position and the tracked head or eye position, it is determined whether a said selectable object is located at a first screen position, the first screen position being a position on the display screen such that the first hand at least partly obscures the user's view of the selectable object. If it is determined as so located, then selectable object is determined as selected.

11 Claims, 21 Drawing Sheets

(56) References Cited

U.S. PATENT DOCUMENTS

| | | | | |
|---|---|---|---|---|
| 2012/0249422 | A1* | 10/2012 | Tse | G06F 3/017 345/158 |
| 2013/0154913 | A1* | 6/2013 | Genc | G06F 3/013 345/156 |
| 2014/0198031 | A1 | 7/2014 | Xiong | |
| 2015/0193107 | A1* | 7/2015 | Schwesinger | G06F 3/0304 715/784 |
| 2016/0162082 | A1* | 6/2016 | Schwesinger | G06F 3/167 345/173 |
| 2016/0224109 | A1* | 8/2016 | Lee | G06F 3/005 |
| 2016/0370865 | A1* | 12/2016 | Sakamoto | G06F 3/0485 |
| 2017/0323158 | A1* | 11/2017 | Gordon | G06Q 30/06 |

OTHER PUBLICATIONS

Rozado, D., Hales, J., Mardanbergi, D., (2013) Interacting with Objects in the Environment by Gaze and Hand Gestures.*

Chatterjee, I., Harrison, C., (2015) Gaze+Gesture: Expressive, Precise and Targeted Free-Space Interactions (Year: 2015).*

Rozado, D., Hales, J., Mardanbergi, D., (2013) Interacting with Objects in the ENvironment by Gaze and Hand Gestures (Year: 2013).*

International Search Report dated Feb. 24, 2016, issued by the International Searching Authority in application No. PCT/JP2015/062316.

Written Opinion of the International Searching Authority dated Feb. 24, 2016, issued by the International Searching Authority in application No. PCT/JP2015/062316.

\* cited by examiner

GESTURE INTERFACE

CROSS REFERENCE TO RELATED APPLICATIONS

This application is a National Stage of International Application No. PCT/JP2015/062316 filed Apr. 16, 2015, the contents of all of which are incorporated herein by reference in their entirety.

TECHNICAL FIELD

The present invention relates to user interfaces, and more specifically to a user interface apparatus for selecting a selectable objects displayed on a display screen.

BACKGROUND ART

Traditionally, a user may interact with a user interface of a computer or other processing system by physically manipulating a device, such as a mouse, joystick, games controller, keyboard, etc., by which the user's movements and actions may be translated into movements and actions on a display screen. In such systems, a pointer, such as a mouse pointer, is typically displayed on the display screen to allow the user to know with which part of the display he or she is interacting.

Other user interfaces, so called "Natural User Interfaces", such as the Microsoft™ Kinect™' utilise technology able to track the movements of a user's body to enable a user to interact with a user interface, for example using sensors such as cameras and the like together with image processing technology. Typically in such interfaces, a user's hand is tracked and movement of a pointer is correlated with the tracked hand movement, in analogy with the mouse technology described above. However, these interfaces are unintuitive and difficult to operate for the user. Further, because the user must first move the arm in order to find the pointer, move the pointer toward a target, and then adjust speed and amplitude of movement in order to reach precisely the target, these interfaces are inefficient and can cause fatigue in the user, especially for larger display screens.

SUMMARY OF INVENTION

According to a first aspect of the present invention, there is provided a method for use in a user interface apparatus for selecting a selectable object on a display screen, the display screen being arranged to display one or more selectable objects, the method comprising: obtaining first information regarding a first tracked position, the first tracked position being a position of a first hand of a user; obtaining second information regarding a second tracked position, the second tracked position being a position of the head or an eye of the user; determining one or more object positions of the one or more selectable objects on the display screen; determining, based on the first information, the second information and the determined one or more object positions, whether a said selectable object is located at a first screen position, the first screen position being a position on the display screen such that the first hand at least partly obscures the user's view of the selectable object; and in the case of a determination that the selectable object is located at the first screen position, determining that the selectable object is selected.

Further features and advantages of the invention will become apparent from the following description of preferred embodiments of the invention, given by way of example only, which is made with reference to the accompanying drawings.

DESCRIPTION OF EMBODIMENTS

Figure 1A:
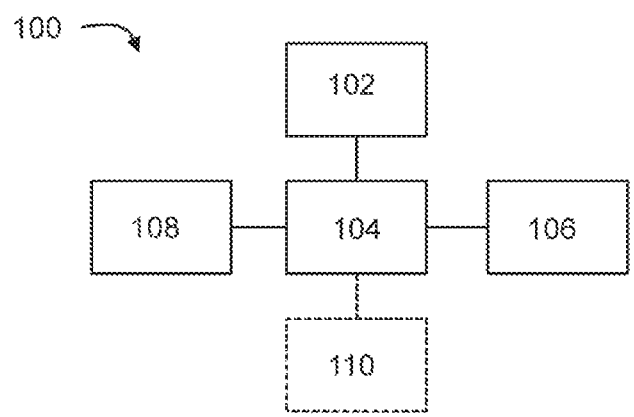
FIGS. 1a-1b show schematic diagrams of the components of a user interface apparatus according to exemplary embodiments.

FIG. 1a is a schematic diagram of the components of a user interface apparatus 100 according to some exemplary embodiments. The user interface apparatus 100 comprises sensor component 102 for tracking the position of a user, processor 104, memory 106, and display screen 108 for displaying information to a user.

The processor 104, using software stored in the memory 106, processes information input to the processor 104, and generates information that is output from the processor 104. For example, information relating to the position of a user of the user interface apparatus 100 obtained by the sensor component 102 may be sent to the processor 104 for processing, and information for use in displaying visual information to the user on the display screen 106 may be sent to the display screen 106 from the processor 104.

The display screen 108 may comprise any means for displaying information to a user of the user interface apparatus 100, and may display a user interface, for example a graphical user interface, to the user. The display screen 108 may be a projector screen 108, and the visual information may be projected by a projector (not shown) onto the projector screen 108 such that the user can see the visual information. The projector screen 108 may be any suitable surface for enabling a user to see a graphical user interface or the like projected thereon.

The sensor component 102 may comprise any number of sensors for sensing attributes of the local environment in which a particular sensor is located, and more specifically for sensing attributes of a user of the user interface equipment. For example, the sensor component may comprise a camera for acquiring images of a user, or a portion of a user. The camera may be, for example, a "Red-Green-Blue" (RGB) "Charge Coupled Device" (CCD) camera for acquiring colour images of the user and the user's environment. The camera may acquire a plurality of such images as a function of time so as to acquire a moving image of the user and the user's environment, and hence acquire information relating to the movement of a user or a portion of the user. As will be described in more detail below, the sensor component 102 may comprise sensors for acquiring depth information as a function of time so as to enable three dimensional tracking of the position of the user or portions of the user in three dimensional space. Depth sensing may be achieved for example using "time-of-flight" sensors or "structured light" sensors to determine the distance of an object from the sensor. The sensor component 102 feeds sensing information relating to, for example the attributes and or positions of the user, to the processor 104 for processing. The user interface apparatus 100 need not necessarily comprise sensor component 102, which may instead be remote from user interface apparatus 100. In such a case, the sensor component 102 may be communicatively connected to user interface apparatus 100 by a communications interface (not shown) of the user interface apparatus 100, for example via fixed or wireless connection. This connection may carry, for example, information regarding the tracked positions of portions of the user from sensor component 102 to user interface apparatus 100.

In one embodiment, the user interface apparatus 100 comprises a gaze-sensor component 110 for tracking the direction in which a user of the user in interface apparatus is looking. For example, the gaze-sensor component may track the position on the display screen 108 at which the user's eyes are directed. The gaze-sensor component 110 may comprise any number of sensors suitable for tracking a gaze direction of a user. The gaze-sensor component may comprise sensors attached to the user 200, for example a camera for acquiring images of a user's eye, and, for example, a magnetometer for sensing the direction in which a user's head is facing with respect to a fixed magnetic field, or an image processing system utilising facial recognition software, to determine the direction in which a user's head is facing relative to display screen 108. However, any other sensor or combination of sensors suitable for tracking the gaze direction of a user may be used. For example, the gaze sensor component 110 may also comprise remote gaze sensors which track the gaze direction of a user by projecting near infrared patterns onto the user and imaging the projected patterns reflected from the user's eyes in order to determine the position of the eyes, and hence the gaze direction of the eye, relative to the micro projector. In any case, in this embodiment, the gaze sensor-component 110 provides the processor 104 with information relating to the gaze-direction of the user.

Figure 1B:
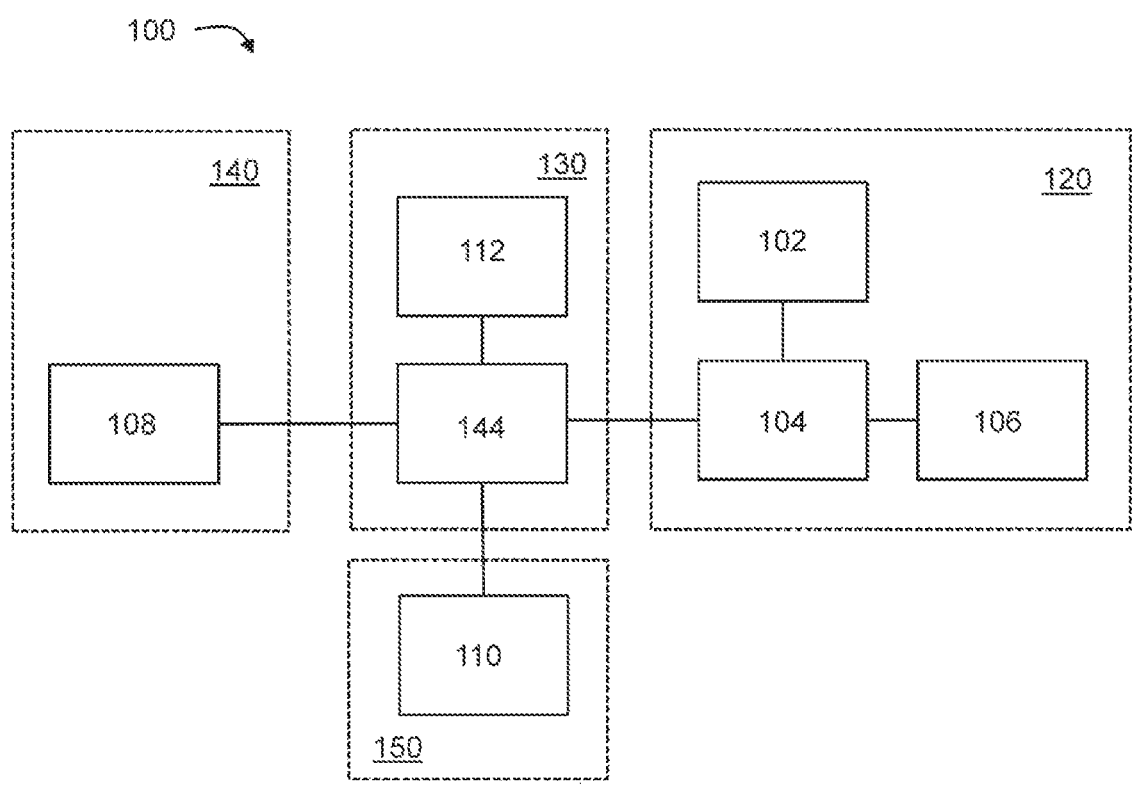

FIG. 1b shows a schematic diagram of components of a user interface apparatus 100 according to some exemplary embodiments. In these embodiments, the user interface apparatus comprises a sensing module 120, a gaze sensing module 150, a processing module 130, and a display module 140. The processing module receives information relating to, for example, the position of the user or portion of the user acquired by the sensing module 120, and/or information relating to the user's gaze direction acquired by the gaze-sensing module 150, and processes, utilising the memory 112, the information using processor 114. The sensing module 120 comprises a sensor component 102, a processor 104 and a memory 106. The processor 104 is for, for example processing information generated by the sensor component 102 and providing information to the processing module 130, for example relating to the position or attribute of the user or a portion of the user in a format recognisable by the processing module 130. The gaze sensing module 150 may comprise a gaze sensor component 110 as described above. The display module 140 comprises display screen 108. The processing module 130 provides information to the display module 140 relating to, for example, information for the display module 140 to display to the user using display screen 108. The processing module 130 need not necessarily be co-located with any of the other modules. For example, the processing module 130 may be located on a server located, for example within the internet. The processing module 130 may obtain information regarding positions of portions of the user, for example from sensing module 120, and/or gaze sensing module 120, over the internet. The processing module 130 may also provide information to the display module 140 for displaying to the user over the internet. As such, the user interface apparatus 100 may be embodied solely on processing module 130, which, as described above, may be located on a server in the internet.

In some embodiments, the user interface apparatus 100 does not comprise a gaze-sensing module 150 or gaze-sensing component 110.

In a specific example, the sensing module 120 may be a Microsoft™ Kinect™, the processing module 130 may be a personal computer or a Microsoft™ Xbox™, and the display module may comprise a projector projecting onto a projector screen.

Figure 1C:
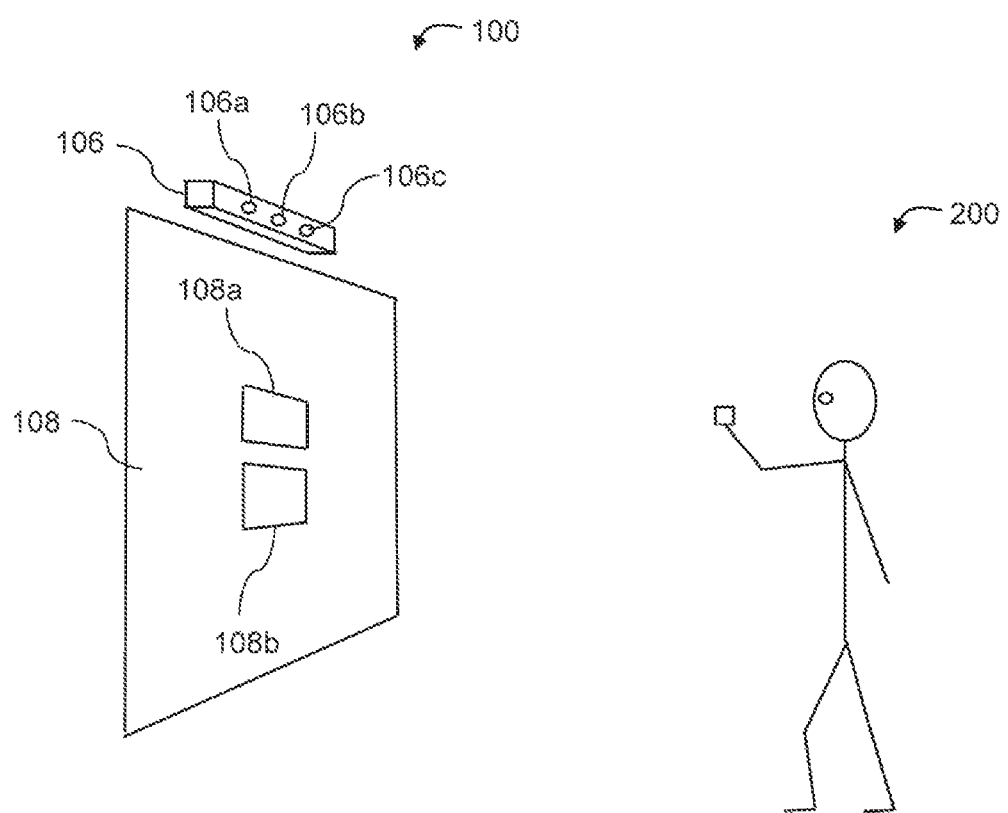
FIG. 1c shows an illustration of an exemplary user interface apparatus in use by a user according to an embodiment.

FIG. 1c is an illustration of an exemplary embodiment of user interface apparatus 100 in use by a user 200. Shown in FIG. 1c is sensor component 106, comprising sensors 106a, 106b and 106c directed towards the user 200. Also shown is display screen 108, towards which the user 200 is facing. As described in more detail below, by determining the position and/or configuration of portions of the user 200, the user interface apparatus 100 may enable the user 200 to interact with selectable objects 108a and/or 108b displayed on the display screen simply by the movement of the user's body.

Figure 2A:
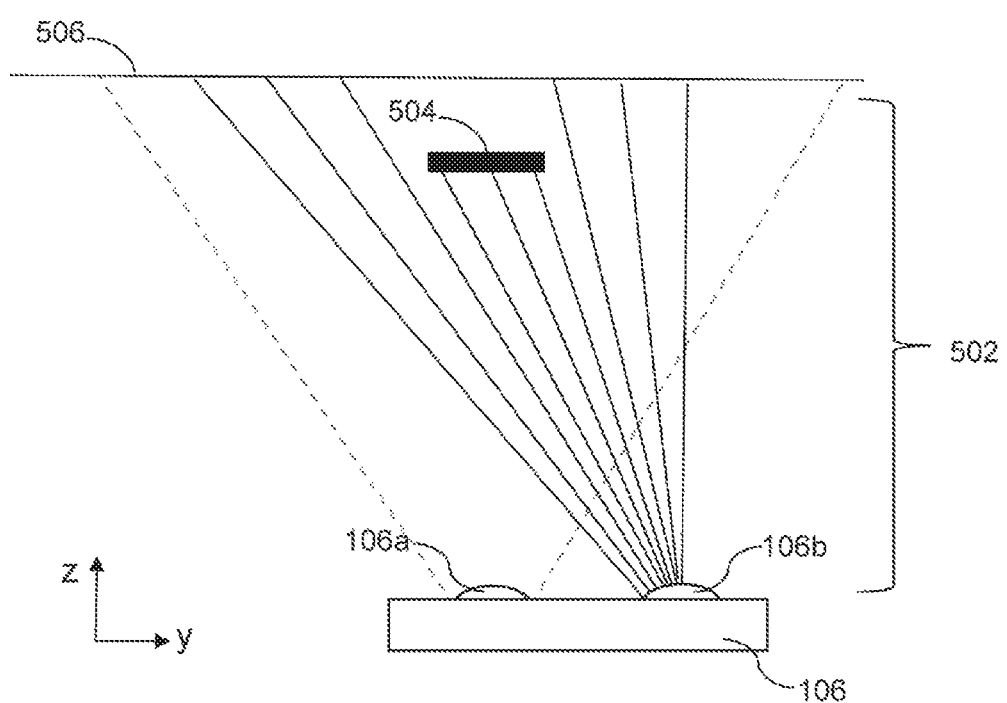
FIG. 2a is a schematic diagram of an exemplary method of sensing depth information.
Figure 2B:
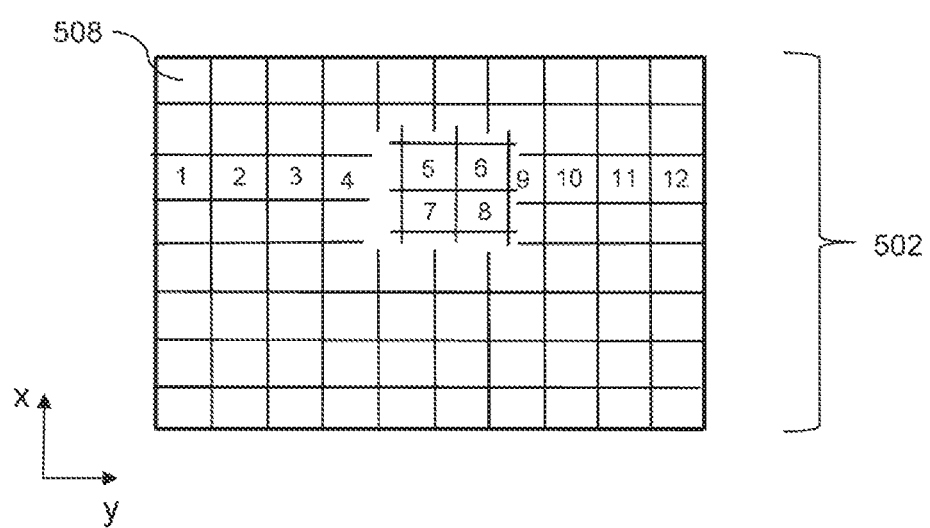
FIG. 2b is a schematic diagram of information obtained in an exemplary method of sensing depth information.

A method by which depth information, and hence three dimensional position information of a user, can be acquired and determined by user interface apparatus 100 will now be describe with reference to FIGS. 2a and 2b.

FIG. 2a is a schematic diagram of a plan view (i.e. the z-y plane as indicated in FIG. 2a) of an exemplary sensor component 106 of a user interface apparatus 100, sensing the three dimensional position of the object 504 against background 506. The object 504 may be a user 200, or a portion of a user 200. The sensor component 106 comprises two sensors 106a and 106b, which are separated from each other in a plane perpendicular to the principle axis of each sensor. Sensor 106b is a light emitting device that produces a structured pattern of light 502 which is cast onto the object 504 and the background 502. Sensor 106a is a sensor for acquiring images of the structured light pattern 502 as it is cast onto the object 504 and the background 506. The light 502 may be, for example, infra-red radiation, and the sensor 106a may be an infrared sensor, which may include a band pass filter centred on the frequency of the structured light 502 so as to increase capture efficiency of the structured light pattern 502 as it is cast onto object 504 and background 506.

The structured light 502 may be, for example, in the form of a two dimensional grid of light 502. Each element 508 of the grid 502 may being identifiable from other elements 508 in the grid 502 by, for example, comprising a unique identifier. Such a unique identifier may be, for example, a portion of a random or pseudo random pattern, for example a portion of a speckle pattern produced by a laser. A pseudo random pattern may also be created, for example, by one or more LEDs whose emission is hindered by a mask comprising a pseudo random pattern of holes. Such a portion of a random or pseudo random pattern may be a group of high intensity areas, or spots, of a speckle pattern. Due to the random distribution of the spots, the configuration of adjacent spots in a particular group of spots is very likely unique to that group of spots, and hence a particular region of the speckle pattern, or the grid element 508 to which the particular region corresponds, can be uniquely identified amongst other regions or grid elements 508.

FIG. 2b illustrates schematically an image acquired by the sensor 106a in the situation shown in FIG. 2a. The sensor 106a images the structured light pattern 502 that falls onto the object 504 and background 506 from a perspective slightly offset from the light source sensor 106b. In FIG. 2b, the structured light pattern 502 is represented by grid 502 comprising grid elements 508, each of which are uniquely identifiable from other elements 508 of the grid 502. For example, each grid element 508 may contain a region of speckle pattern (not shown) that can be uniquely identified as described above. The unique identifiers are represented in FIG. 2b as grid numbers 1, 2, 3 . . . 12. Because sensor 106a is offset from light emitting sensor 106b, the image of the grid pattern from sensor 106a of grid pattern 502 falling on an object 504 closer to the sensor component 106 will appear offset from the grid pattern 502 falling on background 506 further away from the sensor component 106. This can be seen in FIG. 2b as grid elements 5-8 are offset from grid elements 1-4 and 9-12 in both the x and y direction. If the position of grid elements imaged by sensor 106a is predetermined at a given background distance, then from the offset of elements relative to the predetermined positions, by using trigonometry, the distance of an object at the offset elements relative to the given background distance can be calculated. For example, from the offset of elements 5-8 relative to a reference image of the same grid at a predetermined distance, it can be determined from the image of FIG. 2b that there is an object (i.e. object 504 of FIG. 2a) at an x-y position corresponding to the coordinates of elements 5-8, and that the object is a distance z from the sensor component 106.

In such a way, depth information, i.e. the three dimensional coordinates of an object 504, for example a user 200 or a portion of a user 200, relative to sensor component 106 may be determined.

Figure 3:
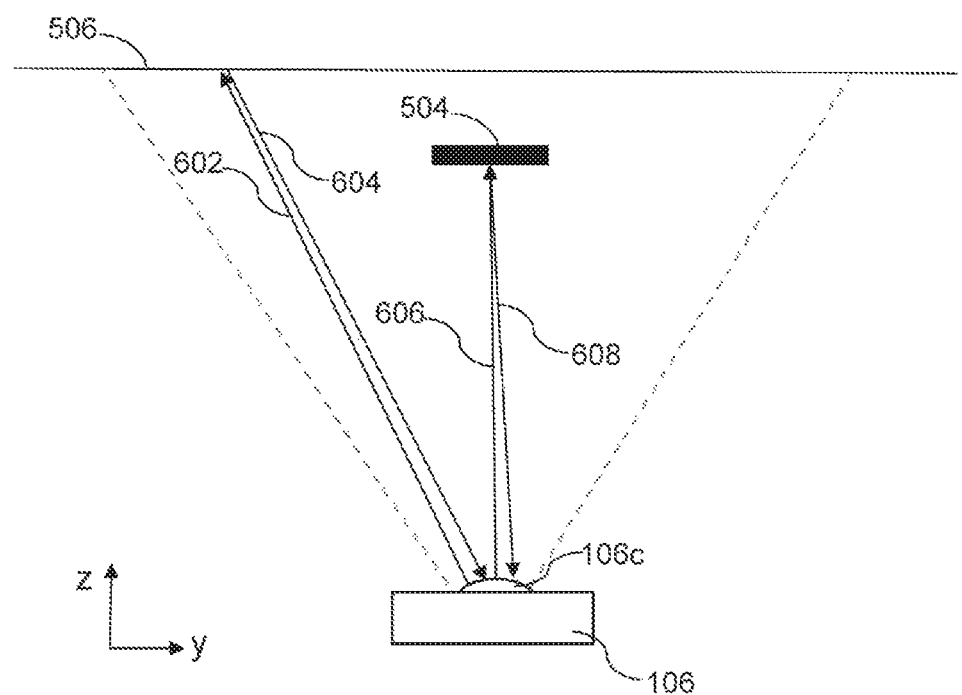
FIG. 3 is a schematic diagram of an exemplary method of sensing depth information.

An alternative exemplary method by which user interface apparatus 100 may determining depth information is illustrated in FIG. 3. Similarly to FIG. 2a, FIG. 3 illustrates a plan view (z-y plane) of an exemplary sensor component 106 sensing the three dimensional position of an object 504 and a background 506. In this case, sensor component 106 comprises a single sensor 106c comprising a light source substantially co-located with a light detector. In this method, the length of time taken for a beam of light emitted from the light source to bounce off an object and return to the detector is recorded for different positions in the x-y plane (i.e. a "time-of-flight" measurement). In such a measurement, a given time for a round trip infers a given distance of the object from the sensor component 106. For example, in FIG. 3, the sum of the time for light paths 602 and 604 to and from the background 506 and the sum of the time for light paths 606 and 608 to and from the object 504 can be used to infer the distance of the background 506 at a given x-y position and the object 504 at a given x-y position respectively. In such a way, the three dimensional coordinates of an object 504, for example a user or a portion of a user, relative to sensor component 106 may be determined.

It will be appreciated that any suitable method or means of determining the three dimensional coordinates of an object may be used, and the above described methods are examples only.

Figure 4A:
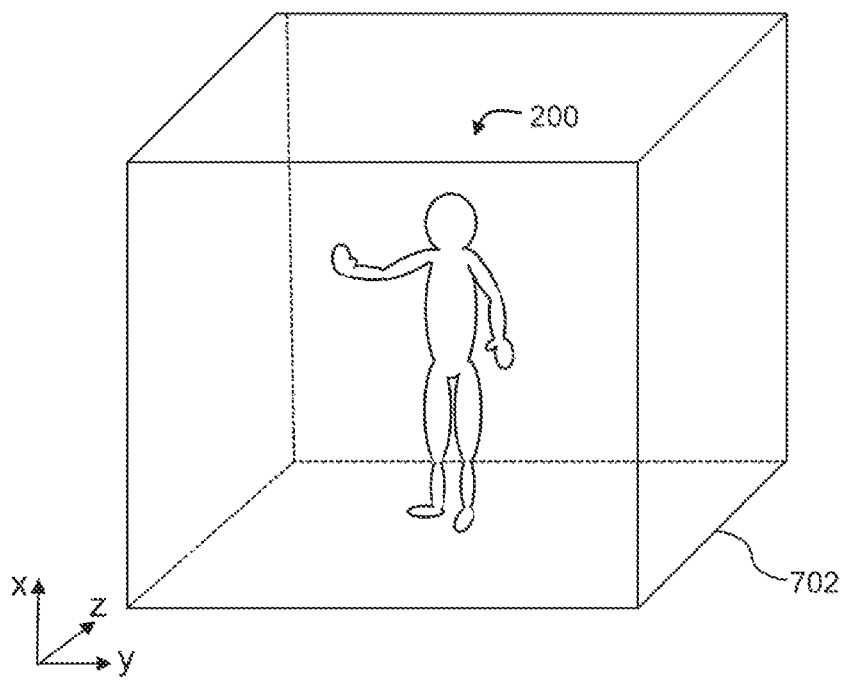
FIG. 4a is an illustration of a rendering of a user in virtual three dimensional space.

In some embodiments, from the determined 3D coordinates, the user interface apparatus 100 maps out the determined three dimensional coordinates of the environment sensed by sensor component 106 in a virtual three dimensional space 702, as illustrated in FIG. 4a. In this exemplary embodiment, a user 200 is positioned relative to the sensor component 106 such that the three dimensional coordinates of the entire user 200 visible from the sensor component's 106 perspective is mapped out in a virtual three dimensional space 702 by the user interface apparatus 100. It should be noted that, although not shown in FIG. 4a, according to the above described methods of determining depth information (i.e. the z coordinate) there will be a shadow of information behind the user from the point of view of the sensor component 106 in the virtual three dimensional space. This may be rectified, for example, by a second sensor component 106 at right angles to the sensor component 106, although this is not typically necessary to accurately determine the 3D position of a portion of a user 200.

Figure 4B:
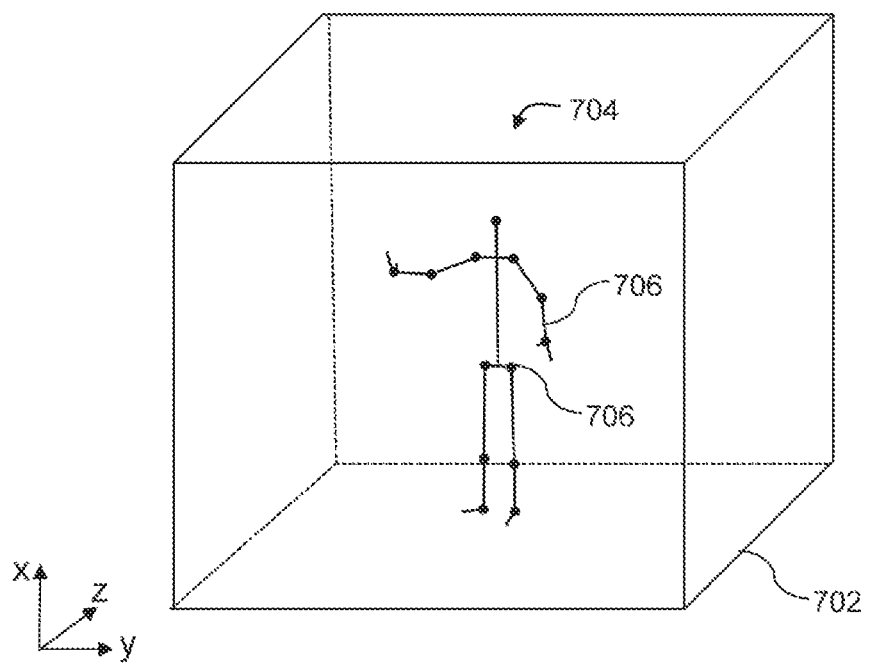
FIG. 4b is an illustration of a generated virtual representation of a user in virtual three dimensional space.

From an analysis of the mapped out 3D coordinates of the user 200 in virtual space 702, the user interface apparatus 100 may generate a virtual representation 704 of a user 200 in virtual 3D space 702, as illustrated in FIG. 4b. The virtual representation 704 comprises joints (e.g. hip joint 706) and extensions (for example forearm 708) corresponding to those of the user 200. The virtual representation 704 generated by the user interface apparatus 100 is that representation determined to have a high likelihood of matching the dimensions, positions and configurations of the respective joints and extensions of the actual user 200. This may be achieved, for example, using three dimensional constrained fitting methods to fit a potential virtual representation 704 to the mapped out three dimensional coordinates of the user 200. In some embodiments, a number of potential virtual representations 704 may be determined as candidates for being the most likely represent the actual user 200. These candidate representations 704 may each be compared to a database of virtual representations of users predetermined to be faithful representations of actual users. This set of predetermined faithful representations may comprise those of a vast array of users of different dimensions in a vast array of different positions and configurations, thus substantially mapping out the landscape of representations likely to be adopted by a user 200. The candidate representation 704 that most closely matches the largest number of predetermined faithful representations may be chosen as the representation 704 most likely to faithfully represent the actual user 200. Such a comparison may be achieved, for example, by using decision tree methodologies, for example, "Random forest" machine learning methodologies. Similarly, the configuration of a part of a user's body, for example whether a hand of the user is in an open configuration, or in a closed, first like configuration, may be determined by comparison of the mapped out 3D coordinates of a hand portion of a user with an array of predetermined hand configurations. In this way, the hand configuration most likely to faithfully represent that of the user may be determined. This may utilise, similarly to as above, for example, "Random forest" machine learning methodologies. As an example, the Kinect™ for Windows™ Software Development Kit (SDK) 1.7 supports recognition of changes in hand configuration, for example so called "grip and release" recognition.

Determining the most likely faithful virtual representation 704 of the user 200 enables the user interface apparatus 100 to determine the dimensions, positions, and/or configurations of a user 200 or any portion or collection of portions of the user 200. The above mentioned process may be repeated, for example, 30 times a second, to allow the user interface apparatus to track the position of a user or a portion of a user 200 in near-real time. For example, the user interface apparatus 100 may therefore track the three dimensional position of one or more points of a user's body such as a point on the user's hand, the centre of a user's head and/or an eye position, and configurations such as the configuration of a user's hand, in near real time. As described in more detail below, this allows a user to interact with selectable objects displayed on display screen 108, just by the user moving portions of his or her body in free space.

Figure 5A:
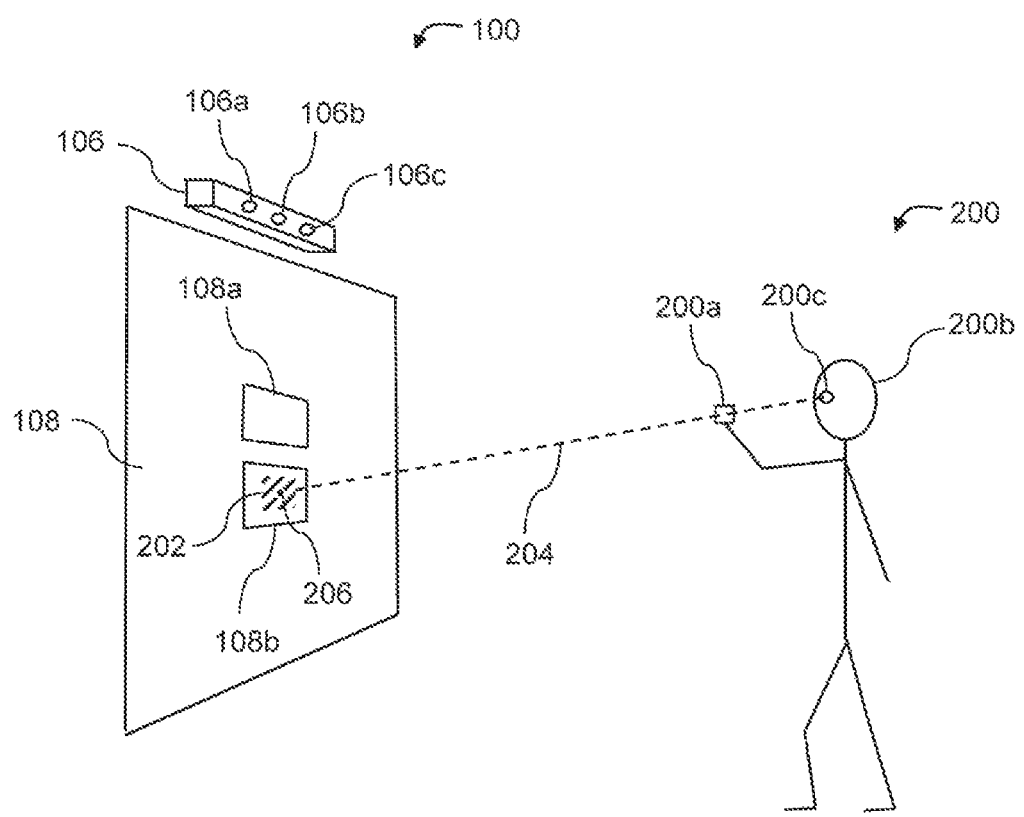
FIG. 5a is an illustration of a user interface apparatus in use by a user according to an embodiment.

FIG. 5a shows a schematic representation illustrating a user interface apparatus 100 according to an exemplary embodiment in use by an exemplary user 200.

The user interface apparatus 100 according to the embodiment shown in FIG. 5a comprises a display screen 108, and a sensing component 106.

The user 200 comprises a hand 200a, an eye 200c, and a head 200b. The user is positioned so that the user is facing the display screen 108, and the hand 200a is outstretched from the user's body in the direction of the display screen 108.

The sensing component 106 comprises three sensors 106a 106b and 106c for tracking the position of the user's hand and the position of the user's head 200b and/or eye 200c, and for determining the configuration of the user's hand 100a, for example, whether the hand 100a is in an open configuration or a closed configuration.

The display screen 108 displays selectable objects 108a and 108b that are selectable by the user 200.

The user 200 interacts with the user interface apparatus 100 using hand 200a. Using the hand 200a, the user 200 obscures from his or her own view the position 202 on the display screen 108 with which he or she wishes to interact.

In FIG. 5a, the user 200 has hand 200a positioned such that the region 202 of the display screen 108 is obscured from the user's 200 view.

The user interface apparatus 100 obtains information relating to a first tracked position, the first tracked position being a position of a first hand (i.e. hand 200a) of the user. The user interface apparatus 100 also obtains information relating to a second tracked position, the second tracked position being a position of the head 200b or an eye 200c of the user 200.

A position of the user's hand 200a (i.e. a "first tracked position") and the position of an eye 200c of the user (an example of a "second tracked position") may define two points of a straight line 204, also referred to herein as the eye-hand line 204.

A position of an eye 200c of the user 200 may refer to a position between the eyes of the user (e.g. the midpoint between the eyes of the user), or the position of the centre on an eye, or pupil of an eye of the user. For example, the position of the centre of a user's hand 200a, and the centre of a user's eye 200c may be used to define the eye-hand line 204. The eye 200c may be, for example, the dominant eye of the user, i.e. the eye of the user from which visual input is stronger or preferred. The dominant eye 200c may be, for example, identified to the user interface apparatus by suitable input by the user.

From obtaining information relating to the first tracked position (e.g. the tracked position of the user's hand 200a) and the second tracked position (e.g. the tracked position of a user's eye 200c) as described above, the user interface apparatus may calculate the eye-hand line 204 in its virtual three dimensional space 702.

In FIG. 5a, the eye-hand line 204 intersects with the display screen 108 at point 206, which point 206 is contained within the region 202 of the display screen 108 that is obscured from the user's 200 view by the user's hand 200a. If the position and dimensions of the display screen 108 are determined by the user interface apparatus 100, for example by a calibration process described below, then the user interface apparatus 100 may represent the display screen in the same virtual three dimensional space 702 in which the virtual representation of the user 704 is represented, and hence where the eye-hand line 204 is virtually represented. In this case, the user interface apparatus 100 may determine the point on the display screen in virtual space 702 at which the virtual eye-hand line intersects the display screen in virtual space 702. In such a way, the user interface apparatus 100 may infer the position on the actual display screen 108 with which the user 200 wishes to interact.

Alternative positions other than the position of an eye 200c of the user 200 may be used to define the second tracked position, but which would still result in the eye-hand line 204 intersecting with the display screen 108 in a region 202 of the display screen 108 obscured from the view of the user 200. For example, the midway point between the two eyes 200c of the user 200 may be used. This may be advantageous as this would allow a point of intersection 206 of the head-hand line 204 with the display screen 108 contained in the region 202 obscured from the user's vision to be determined without requiring a knowledge of which eye 200c of the user 200 is stronger or preferred or otherwise should be used in defining the head hand line 204.

The second tracked position may alternatively be a position of the head 200b of the user, for example the centre of a user's head 200b.

A position of the user's hand 200a (i.e. "first tracked position") and the position of the head 200b of the user 200 (an example of a "second tracked position") may define two points of a straight line 204, referred to in this case as the head-hand line 204. Although the term "eye-hand line" is used in the various discussions below, in some embodiments a head-hand line is used instead.

The eyes of the user 200 are typically located approximately halfway down the vertical length of the user's head 200b, and are set at a substantial depth into the user's head. In this case, the use of the position of the centre of a user's head 200b in defining the second tracked position may still result in the head-hand line 204 intersecting with the display screen 108 in a region 202 of the display screen 108 obscured from the view of the user 200. In this case, the head-hand line 204 may be used by user interface apparatus 100 in place of eye-hand line 204 when determining the portion of the display screen with which the user wishes to interact.

Using a position of a user's head as a second tracked position may be advantageous in situations where it is difficult to detect the position of the eyes or an eye of the user, or in situations where it is more efficient to track the centre of a user's head 200b compared to tracking the position of an eye 200c or eyes of the user 200.

The hand 200a may be either hand of the user 200, and may for example be that hand of the user determined to be closest to the display screen 108, or alternatively or additionally that hand of the user which is the more raised of the two hands of the user 200.

By tracking a position of the user's hand 200a (i.e. a first tracked position) and a position of the user's head 200b or eye 200c) (i.e. a second tracked position) in three dimensional space with one or more of the sensors 106a, 106b and 106c, the user interface apparatus 100 can determine the eye-hand line 204 (or head-hand line 204 as appropriate), and hence determine a point of intersection 206 of the line 204 with the display screen 108 contained within the region of the display screen 202 obscured from the user's view by the user's hand 200a. In such a way, the user interface apparatus 100 can determine a position on the display screen 108 with which the user 200 is to interact.

Figure 5B:
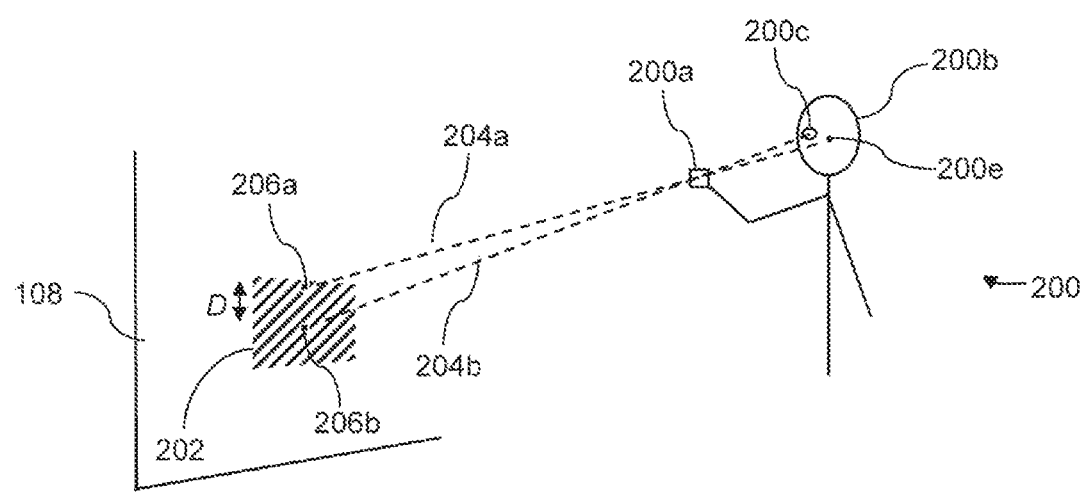
FIG. 5b is an illustration of definitions of a head-hand line and an eye-hand line according to exemplary embodiments.

It should be noted that if the second tracked position is the position of a user's head 200b, for example the position of the centre of the user's head 200b, rather than an eye position, due to the physical separation of the user's eyes from the centre of a user's head, there may be a discrepancy between the point of intersection 206 of the head-hand line 204 determined by the user interface apparatus 100, and the centre of the region 202 obscured from the user's vision (i.e. the region that the user intends to select). FIG. 5b illustrates schematically a potential offset D between point of intersection 206a of a head-hand line 204a (defined using the centre 200e of the user's head 200b), and the point of intersection 206b of an eye-hand line 204b (defined using a position of the user's eye 200c) according to an example. In this example, both points of intersection 206a and 206b are contained within the region 202 obscured from the user's vision. However, the point of intersection 206b (determined using the user's eye position) is closer to the centre of the region 202 obscured from the user's vision than the point of intersection 206a (determined using the user's head position). The point of intersection determined using the head-hand line 204b therefore less consistently results in correct selection of the object intended for selection.

Therefore, using an eye position (e.g. the position of the user's eye 200c) as the second tracked position as opposed to a head position (e.g. the centre 200e of a user's head 200b) allows the user interface apparatus 100 to more accurately and consistently determine the position on the display screen 108 with which the user 200 wishes to interact, and hence may reduce, for example, occurrences of erroneous user-interface interaction. This enables a more intuitive interaction with the user interface.

The user interface apparatus 100 may store information relating to the current position of selectable objects on display screen 108. The user interface apparatus 100 may determine that selectable object 108b displayed on the display screen 108 contains eye-hand line 204 intersection point 206, meaning that selectable object 108b is at least partially obscured from the user's view, and therefore determine that selectable object 108b may be an object to be selected. Conversely, selectable object 108a does not contain intersection point 206, and therefore is not determined to be an object to be selected or otherwise of present interest to the user 200.

As described in more detail below, the user may select the object 108b at least partially obscured from the user's view 200 by changing a configuration of the user's hand 200a. If the user interface apparatus 100 determines that such a change in configuration of a user's hand 200a occurs whilst selectable object 108b contains intersection point 206, the selectable object 108b is determined as selected. Further operations can be performed on a selected selectable object as described in more detail below.

Such determinations as described above may be made, for example, using processor 104 (not shown in FIG. 5a or 5b) and memory 106 (not shown in FIG. 5a or 5b) of the user interface apparatus 100.

With a user interface apparatus 100 as described above, a user 200 may interact with a displayed object (e.g. selectable objects 108a, 108b) in a way he or she 200 may naturally interact with objects, i.e. typically when selecting (i.e. picking up) an object, a user at least partially covers that object with his or her hand, and hence at least partially obscures that object from his or her view. Further, such an interaction avoids requiring a user to move a pointer displayed on the display screen toward a target because the position of the hand and the position of objects displayed on the screen can be directly and visually inferred from his or her own perspective. Such an intuitive interface therefore obviates the need for a pointer to be displayed, and reduces fatigue in the user compared to interfaces using pointers whereby the user must first move the arm in order to find the pointer, move the pointer toward a target, and then adjust speed and amplitude of movement in order precisely to reach the target.

Figure 6A:
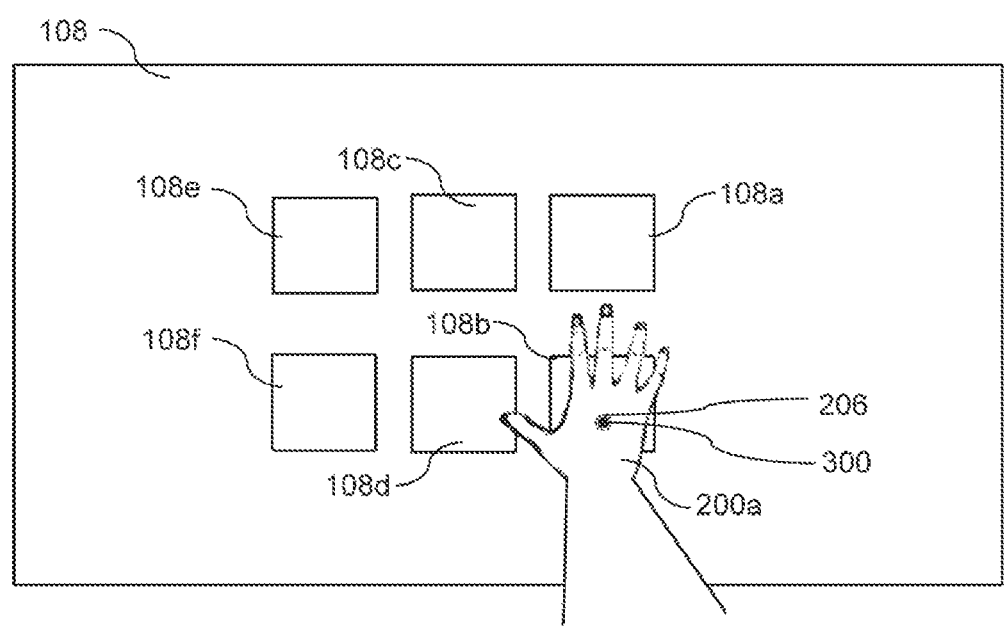
FIGS. 6a-6f are illustrations of a display screen from the perspective of the user, according to exemplary embodiments.

FIG. 6a shows the display screen 108 of the user interface apparatus 100 from the point of view of the user 200 (not shown in FIG. 6). On the display screen 108 there are displayed 6 selectable objects 106a to 108f. The positions of the selectable objects 106a to 106f on the display screen are determined by the user interface apparatus 100, for example because the image displayed on the display screen 108 is derived from information generated by the processor 104 of the user interface apparatus 100. In this example, the user 200 wishes to select selectable object 108b. The user therefore positions his or her hand 200a so as to obscure object 108b from his or her view. In FIG. 6a, the user's hand is spread out in a substantially open configuration. Note that, as can be seen more clearly in FIG. 5, the user's hand 200a need not necessarily touch the screen 108 or be any specific distance from display screen 108, the hand 200a need only obscure at least a portion of the object 108b from the user's 200 view. The centre of the user's hand 200a is represented by dot 300. In this example, the eye-hand line 204 (not shown in FIG. 6a) contains the centre of the user's hand. The position 206 on the display screen 108 at which the user's eye-hand line 204 (not shown in FIG. 6a) intersects the display screen 108 is therefore, from the user's perspective, aligned with the centre of the user's hand 300. The user interface apparatus 100 may determine that selectable object 108b contains the intersection point 206, and may, for example, determine object 108b as a candidate object for selection by the user 200. In some embodiments, the user interface apparatus 100 may determine object 108b as a selected object based solely on a determination that selectable object 108b contains the intersection point 206.

In some exemplary embodiments, if the user interface apparatus 100 determines that an object 108b is a candidate object for selection by the user 200, then the user interface apparatus 100 may cause the object 108b to be displayed differently.

Figure 6B:
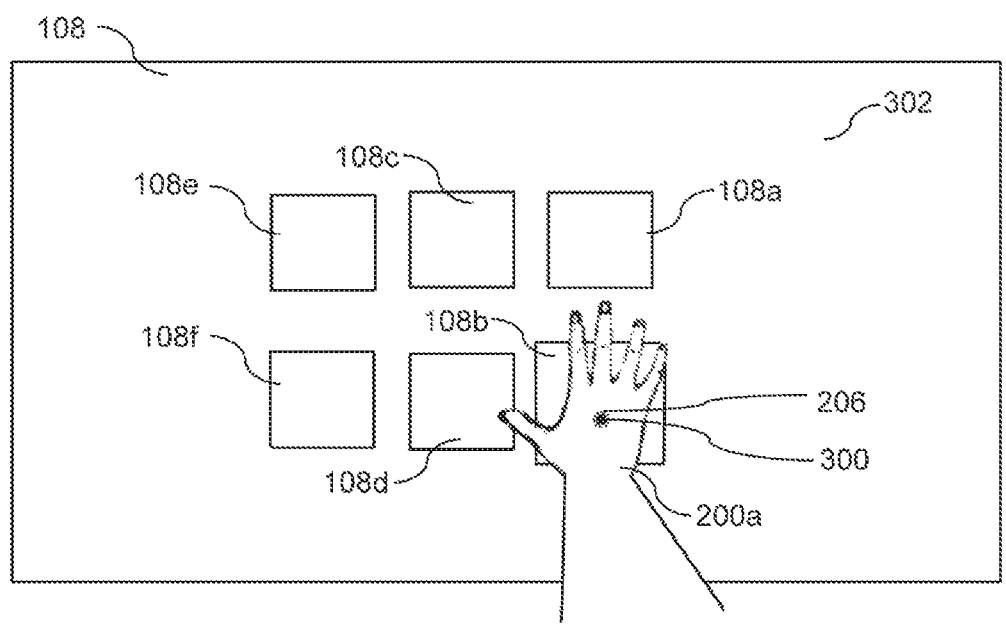

FIG. 6b illustrates an exemplary change to selectable object 108b, where selectable object 108b is increased in size with respect to its size before it was determined as a candidate object for selection. Other changes may be made to an object determined a candidate object for selection, such as, for example, a change of colour, a change of representation of the object, for example the shape of the object, or a complete change in the image symbolising the object. Similarly, the background 302 of the display screen 108 may change, for example change colour or intensity, when such a determination is made. Additionally or alternatively, a sound may be generated by a sound generating means such as a speaker on determination of an object possible for selection, which sound may be, for example, correlated to the object itself. For example, if the object was a representation of a panda, on determination of the object as a candidate object for selection, the representation of the panda may change (for example the face of the panda may change from a neutral expression to a smiling expression), the size of the representation may change, and/or a sound of a panda may be generated. These changes may advantageously alert the user to the possibility of selecting the object 108b which is at least partially obscured from the view of the user 200 by the user's hand 200a.

In other embodiments, no such changes occur on determination that the object is a candidate object for selection. In yet further embodiments, no such determination that an object is a candidate object for selection is made by user interface apparatus 100.

Figure 6C:
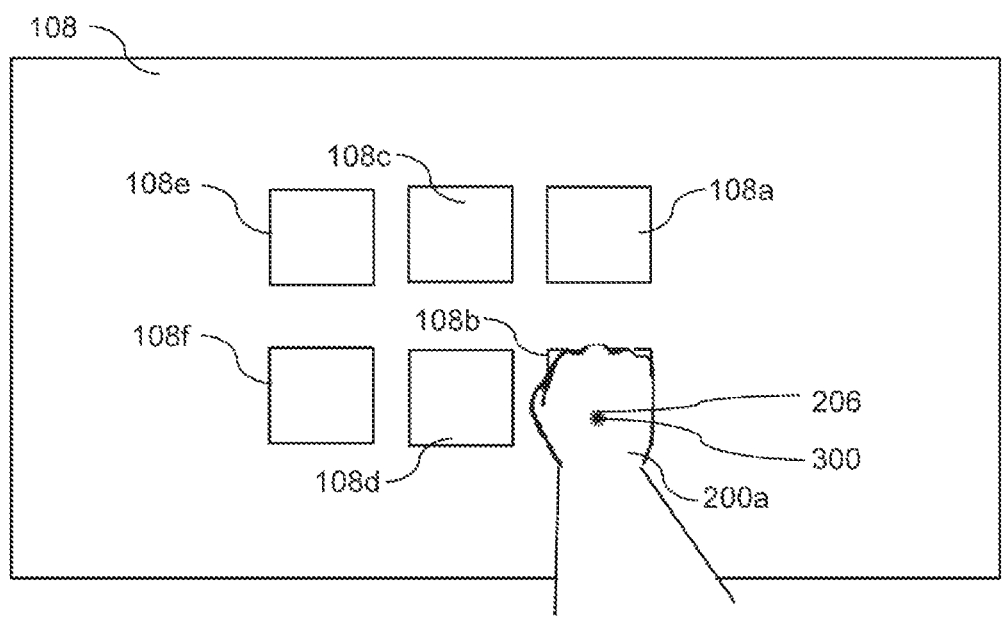

FIG. 6c is an illustration showing a user selecting selectable object 108b, and is the same as FIG. 6a, except that the user has performed a grab-like action, in doing so has changed the configuration of the hand 200a from an outstretched open configuration to a fist-like closed configuration. Note that the object 108b still remains at least partially obscured from the user's view.

In one embodiment, the user interface apparatus 100 determines when the configuration of the hand has changed from an open configuration as in the hand 200a of FIG. 3b to a closed configuration as in the hand 200a of FIG. 3c. In response to such a determination, the user interface apparatus 100 determines the point of intersection 206 of the eye-hand line 204 with the display screen 108. In response to a determination that the intersection point 206 is located within a selectable object 108b displayed on the display screen 108, then the selectable object 108b is determined as selected by the user. In the example of FIG. 6c, since the intersection point 206 does lie within the selectable object 108b as the hand 200a changes to a closed configuration, then the object 108b is determined as selected.

The user interface apparatus 100 need not necessarily determine that a hand configuration of the user has changed in order to determine that a selectable object 108b is selected. In some embodiments, the user interface apparatus 100 continuously (or near continuously, e.g. 30 times a second) determines the point of intersection 206 of the eye-hand line 204 with display screen 108. In this case, in response to a determination that the intersection point 206 is located within a selectable object 108b displayed on the display screen 108, then the selectable object 108b is determined as selected by the user. In such a way, a selectable object 108b may be selected by a user 200 without a need for the user 200 to change a configuration of his or her hand 200a. This may be advantageous, for example, in situations where it is difficult to determine the configuration of a user's hand. In other embodiments, the selectable object may be selected on the basis of the intersection point 206 being located within a selectable object 108b displayed on the display screen 108 for a predetermined duration of time, for example the object may only be determined as selected after the intersection point 206 has been located within the selectable object for 1 second.

Figure 6D:
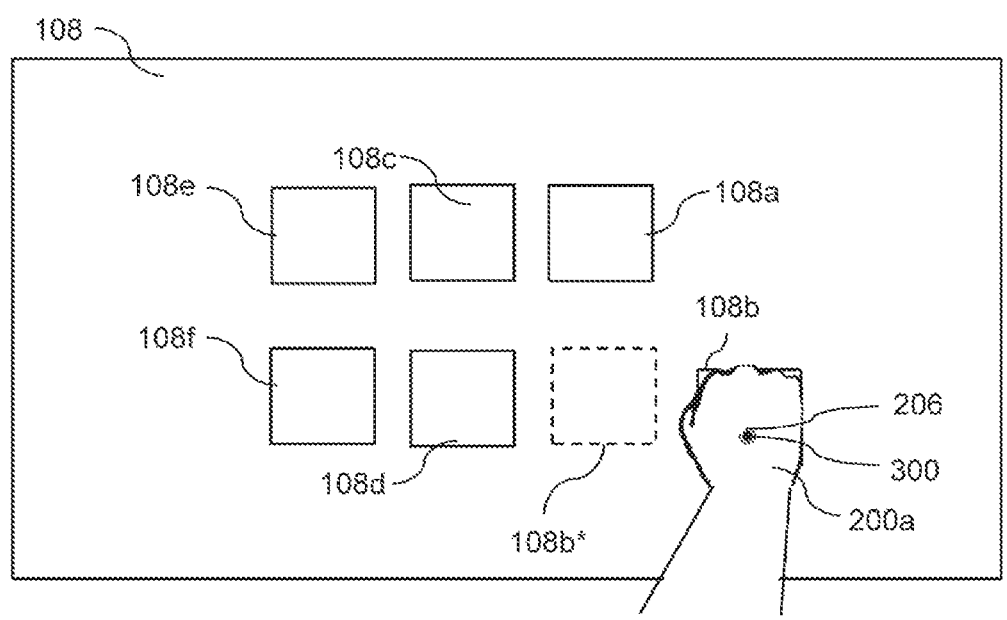

In some embodiments, a selectable object 108b determined as selected may be moved from one location on the display screen 108 to another by the user 200. FIG. 6d is an illustration of a display screen as viewed from the user's perspective, and is the same as FIG. 6c, except the user has moved his or her hand 200a, whilst still in the closed, fist-like configuration, to a different location in his or her field of view, and the position of the selected object 108b on the display screen 108 has moved accordingly. The original position of object 108b before moving is represented by dashed box 108b*. The position to which the object 108b is moved depends on the position to which the user has moved his or her hand 200a, and accordingly the position on the display screen 108 to which the point of intersection 206 of the eye-hand line 204 (not shown in FIG. 6d) has moved. As a result, as can be seen in the example of FIG. 6d, whilst the object 108b is selected, even if it is being moved, the object 108b still contains the point of intersection 206, and the user's hand 200a still at least partly obscures the object 108b from the user's view. In some embodiments, if the user moves his or her hand 200a such that the point of intersection 206 moves outside of the display screen 108, the object 108b may be moved outside of the display screen accordingly. In other embodiments, in such a case, the object 108b may be constrained to not leave the display screen 108, and may for example, in such a case, be automatically deselected. In another example, in such a case, the object may remain in a given position, for example the last position where the point of intersection 206 was determined to be within the display screen 108, until it is determined that the user moves his or her hand 200a such that the point of intersection 206 returns to within the display screen 108, at which time the object will return to the point of intersection 206 as so newly determined.

Figure 6E:
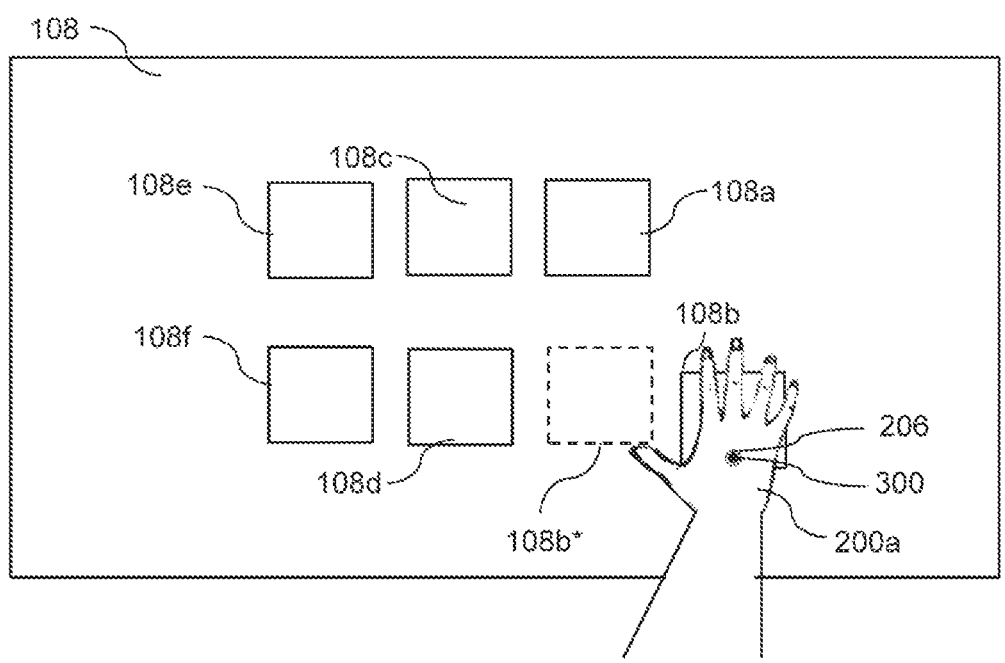
Figure 6F:
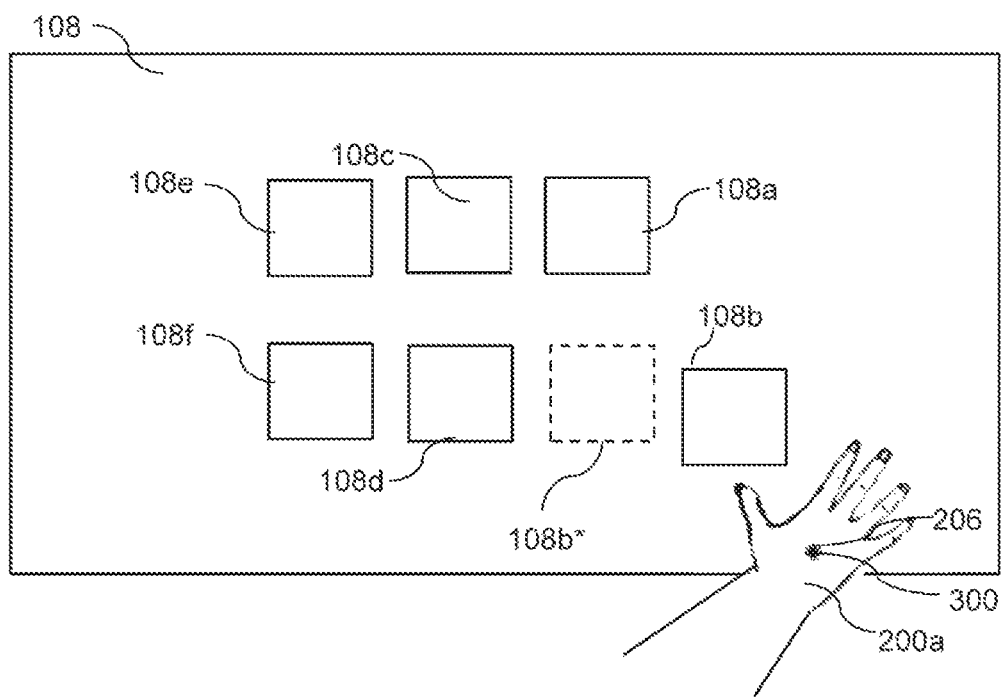

In some embodiments, in order to deselect an object 108b selected as described above, the user changes the configuration of his or her hand 200a from a closed configuration (as in FIG. 6c or 6d), back to an open configuration (as in FIG. 6a). FIG. 6e shows an illustration of display screen 108 from a user's perspective, and is the same as FIG. 6d, except the hand 200a has changed from a closed configuration to an open configuration. On determination that the user's hand 200a has changed from a closed configuration to an open configuration, the user interface apparatus 100 determines that the selected object 108b is unselected. In the example shown in FIG. 6e, the object 108b remains at the same position on the display screen 108 at which it was determined to be unselected. In this case, and movement of the user's hand 200a whilst in the open configuration will have no effect on the deselected object 108b, as it is now deselected. This is illustrated in FIG. 6f, which is an illustration of the display screen 108 from the user's 200 perspective, and is the same as FIG. 6e, except that the user has moved his or her hand 200a, still in the open configuration, to a different position, but the object 108b (now deselected) remains in the same position on the display screen 108.

In the case where the user interface apparatus selects a selectable object 108b solely on the basis that the point of intersection 206 of the eye-hand line 204 with display screen 108 is located within the selectable object 108b, or has been so located for a predetermined amount of time, then the user need not maintain his or her hand configuration in a closed configuration (or indeed any particular configuration) in order to move the selected object. In such a case, the object may be deselected automatically, for example, when the user causes the point of intersection 206 to be outside of the display screen. In another example, the object may be deselected if the user ceases movement of the selected object for a predetermined duration of time, for example if the user interface apparatus 100 determines that, whilst an object is selected, the point of intersection 206 has not moved by more than a predetermined amount (e.g. distance or degree) in the last 1 second, the user interface apparatus 100 may determine that the selected object is deselected.

It will be appreciated that an object 108*b* may also be selected or deselected on the basis of a determined change in the configuration of the hand 200*a* of the user 200 other than a change between an open configuration and a closed configuration or vice versa. Any other suitable configuration change which can be reliably detected by the user interface apparatus 100 may be used. For example, a suitable change in configuration may be a change in the way in which the palm of an outstretched hand 200*a* is facing, for example a change from a configuration where the palm of the hand 200*a* is facing towards the display screen 108 to a configuration where the palm of the hand 200*a* is facing away from the display screen.

Another such suitable change in configuration may be a "pinching" action, whereby a user's hand changes from an open configuration with the fingers outstretched to a closed configuration whereby one or more fingers and the thumb of the hand are brought together whilst still being extended radially from the hand. Another such suitable change in configuration may be on the occurrence of one or more "tapping" actions, whereby the user's hand changes from an open configuration where the fingers are outstretched, for example in a first plane, for example a plane substantially parallel with the plane of the display screen 108, to a second configuration where the hand has rotated about the wrist such that the fingers are outstretched, for example, in a second plane rotated with respect to the first plane, for example a plane substantially perpendicular to the plane of the display screen. In some embodiments, a change in configuration may only be recognised after two or more of these "tapping" actions, such that, for example, a user selects an item by "double tapping" on an object.

In some exemplary embodiments, further operations may be performed on a selected selectable object 108*b* other than moving the location of the object. For example, a user 200 may remove or delete a selected virtual object 108*b* (or data associated therewith) in a similar way as the user 200 may remove a physical object which he or she is holding: by throwing it away. Such a naturalistic interface has, for example, advantages in the ease with which a user may engage effectively with it. Such a "throwing away" action typically comprises a sudden change in position or velocity of the object coupled with the user releasing (deselecting) the object.

In order to achieve this virtually, the user interface apparatus 100 may determine the rate at which a user 200 changes the position of his or her hand 200*a* in a given direction when a given selectable object 108*b* is selected. This can be determined directly by tracking the change in the determined hand 200*a* position in three dimensional coordinates, or by tracking the change in point of intersection 206 of the eye-hand line 204 with the display screen 108. Alternatively the user interface 100 may determine this for example by determining the displacement or distance travelled by the selected object 108*b* on the display screen 108 in a given time (i.e. the average velocity or average displacement velocity of the object 108*b* over a given time interval). The user interface apparatus 100 may additionally or alternatively determine such an average velocity of the object 108*b* over a number of such time intervals, and in such a way determine an acceleration of the object 108*b*. When the user interface apparatus 100 determines that a selected selectable object 108*b* is unselected (for example as described above with reference to FIG. 6*e*) the velocity of the object 108*b* and/or the acceleration of the object 108*b* in one or more time period(s) immediately preceding the determination that the selectable object 108*b* is unselected is determined. The user interface apparatus 100 may compare this determined velocity of the object 108*b* and/or determined acceleration of the object 108*b* to a predetermined threshold of velocity and/or predetermined threshold of acceleration respectively. In the case where the determined velocity and/or acceleration of the object 108*b* is above the respective threshold, then the user interface apparatus 100 may perform a further processing action on the object; and if not then not perform a further processing action. An exemplary further processing action may be a deletion of the object 108*b*. This deletion may correspond to removing the object 108*b* from display on the display screen 108, and/or moving data associated with the object 108*b* from one directory of the memory (e.g. memory 106 or 112) in which the data is stored to another, and/or removing the data altogether.

Figure 7:
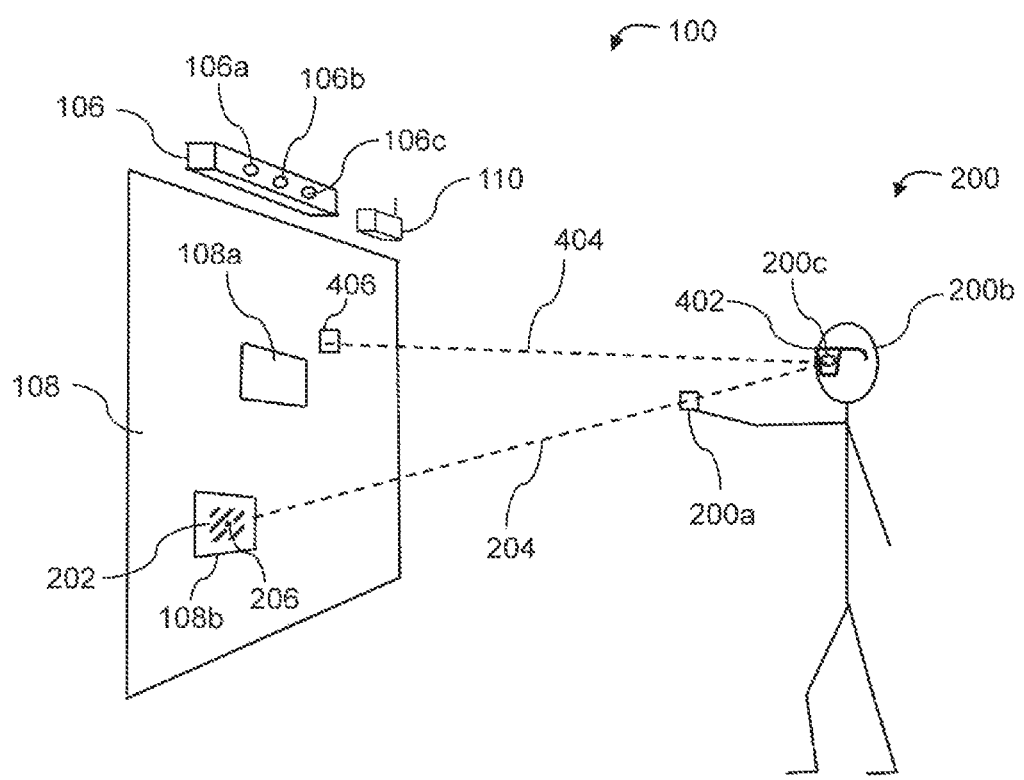
FIG. 7 is an illustration of a user interface apparatus in use by a user according to an embodiment.

FIG. 7, similarly to FIG. 5, illustrates a user 200 using a user interface apparatus 100 according to another exemplary embodiment. In this embodiment, the user interface apparatus comprises a gaze-sensor 110 for use in sensing the gaze direction 404 of the user 200, comprising glasses 402 worn by the user 200. The glasses 402 may track the rotation of the eye 200*c* of the user relative to the glasses 402, for example by tracking the position of the pupil of the eye using infra-red cameras. Since, in operation, the glasses 402 are fixed relative to the user's head 200*b*, the glasses 403 can track the rotation of the eye 200*c* relative to the user's head 200*b*. Since the position of and direction in which the user's head is facing relative to the display screen 108 may be determined by the user interface apparatus 100, then it may determine the gaze direction 404 of the user 200 relative to the display screen 108. Alternatively, the gaze sensor 110 may comprise other components (not shown) for determining the gaze direction 404 of the user 200 relative to the display screen 108. These components may comprise, for example, magnetometers to track the change in orientation of the head of the user 200*b* with respect to a given direction.

Alternatively, gaze sensor 110 may comprise any other suitable technology for determining the gaze direction of the user relative to the display screen 108.

In this embodiment, the user interface apparatus 100 may determine a point 406 on the display screen at which the user is looking by extrapolating determined gaze direction 404 from the determined tracked position of the user's eye 200*c* in three dimensional space.

It should be noted that, in FIG. 7, although the user is looking at point 406 on the display screen 108, region 202 of the display screen 180 is still obscured from the user's view by the user's hand 200*a*. In this case, the user interface apparatus 100 still determines the point of intersection 206 of the eye-hand line 204 with the display screen 108 as a point for use in controlling selectable objects 108*a* or 108*b* displayed on the display screen 108.

In FIG. 7, the point of intersection 206 of the eye-hand line 204 with the display screen 108 is such that it is contained within selectable object 108b. However, the point 406 on the display screen 108 at which the user 200 is looking is separated from the point of intersection 206 of the eye-hand line 204 with the display screen 108 by a distance d (not shown in FIG. 7).

In one example, the object 108b is selected by the user. If it is determined that the object 108b is unselected by the user (for example if the user interface apparatus determined that the configuration of the user's hand 200a changes from a closed configuration to an open configuration) then the user interface apparatus 100 determines the distance d between the point 406 and the point 206. If it is determined that the distance d is above a predetermined threshold, the user interface apparatus may perform a further processing operation on the object 108b, and if it is determined to be below the predetermined threshold then it may not perform a further processing operation. The further processing operation may be, for example, a deletion of the object as described above, or may be any other conceivable further processing operation, for example: save, copy, zoom, rotate, resize etc.

In another example, the user interface apparatus may determine that the point of intersection 206 of the eye-hand line 204 and the point 406 on the display screen 108 at which the user is looking are held separated a distance d from each other by more than a threshold amount, for more than a threshold amount of time. For example, a user 200 may hold his or her hand 200a in one position whilst his or her gaze is held directed at a different position on the display screen 108, for example, for more than 1 second. Upon such a determination, the user interface apparatus 100 may determine that a further processing action should be performed, for example, to re-arrange all of the selectable objects 108a, 108b etc. on the display screen 108 into a pattern on the display screen 108, for example in a grid distribution. In such a way the user may control the user interface apparatus 100 to position the selectable objects 108a, 108b, etc. such that, for example, they may be more easily and readily distinguished and selected by the user 200.

Figure 8:
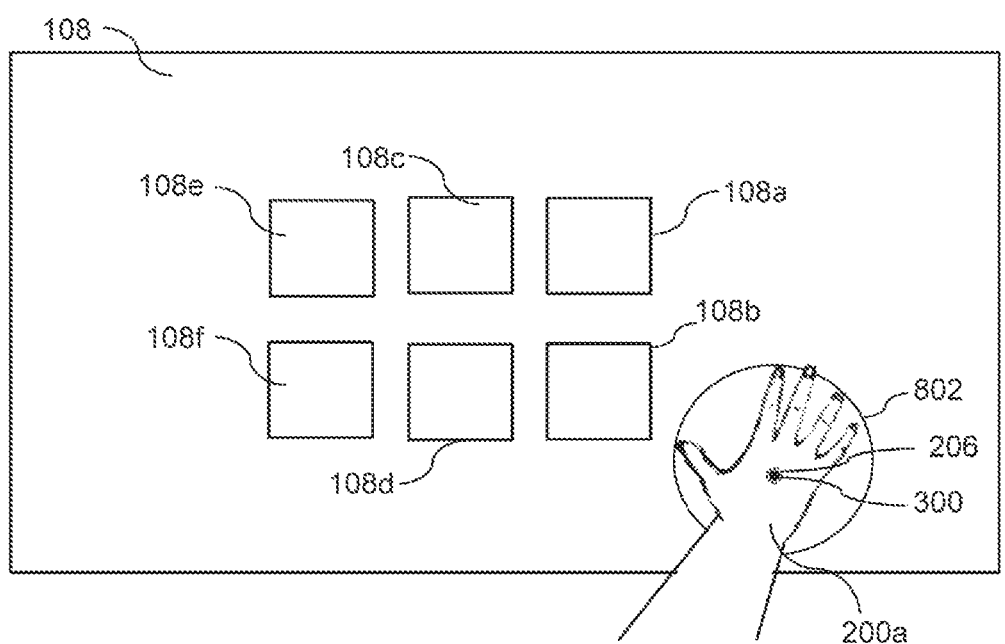
FIG. 8 is an illustrations of a display screen from the perspective of the user, according to an exemplary embodiment.

In such ways as described in the examples above, the user interface apparatus 100 can obtain more degrees of control from the user 200, and as such provide a more efficient interface with which the user 200 may interact. In some embodiments, the user interface apparatus 100 may determine that the user 200 has a low competence level in using the user interface apparatus 100, e.g. that the user 200 is a beginner, and may not be used to the control paradigm provided by user interface apparatus 100. For example, the user interface apparatus may determine that the user 200 has changed the configuration of his or her hand 200a from an open configuration to a closed configuration (i.e. signifying to select an object) at a position on the display screen at which there is no selectable object 108b to select. The user interface apparatus 100 may determine that such an occurrence has happened successively more than a predetermined number of times. In this case, the user interface apparatus 100 may cause a pointer, or some symbolic indicator to be displayed on the display screen at a position related to the determined point of intersection 206 in order that the user may be reminded of the location on the display screen with which he or she is interacting. The pointer may only be displayed for a predetermined period of time, for example 5 seconds to allow the user to orientate themselves with the display screen. Alternatively, the pointer may only be displayed for a predetermined number of determined changes in hand configuration of the user, or otherwise until such time as the user 200 successfully selects an object 108b. The pointer may be arranged such that it is not obscured from the view of the user 200 by the user's hand 200a when it is displayed on the display screen. Such an exemplary pointer is shown in FIG. 8, which shows display screen 108 displaying selectable objects 108a to 108f, and also displaying circular pointer 802 centred on the determined point of intersection 206, and with a large enough diameter so as to not be completely obscured from the user's view by the user's hand 200a.

The user interface apparatus 100 may additionally or alternatively determine a low competence level, if an action is repeated by a user more than a predetermined number of times. For example, if a user selects an object, moves it, and then replaces the object to at or nearby its original position, say, more than three times successively, this may be indicative of a user selecting an object other than the object he or she intends to select, and the user interface apparatus 100 may determine a low competence level and display a pointer as described above accordingly to remind the user of the control paradigm. It will be appreciated that the above are examples only, and that repetition of any user action more than any pre-defined or dynamically determined number of times may cause a low competence level to be determined, and hence a pointer or other control paradigm reminder, such as for example a message, to be displayed.

In some embodiments, the dimensions and position of the screen 108 in virtual three dimensional space 702 is determined by the user interface apparatus in a calibration procedure.

In some embodiments, the point of intersection of two determined eye-hand lines 204 associated with a user 200 standing in two different positions is used by user interface apparatus 100 to infer a three dimensional coordinate of the display screen 108.

Figure 9:
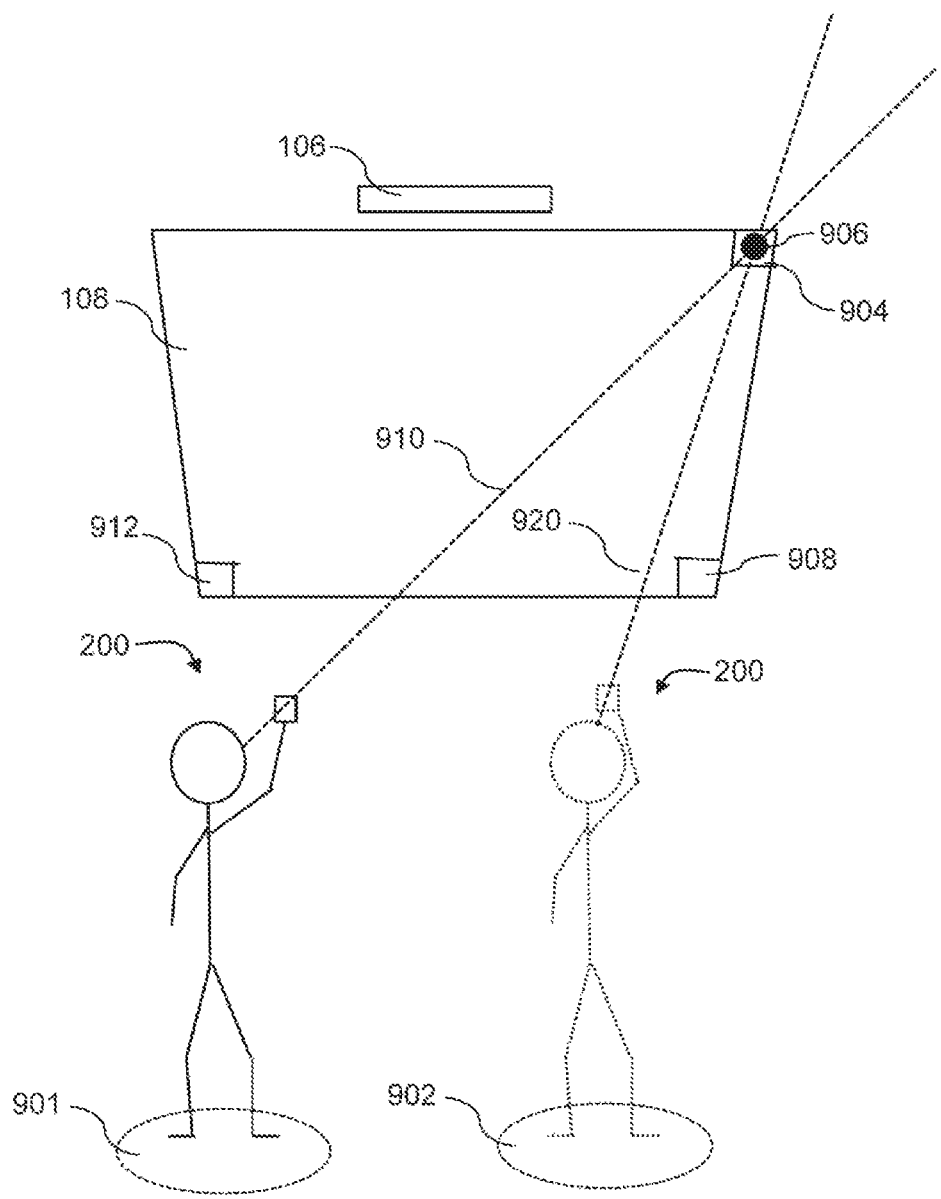
FIG. 9 is an illustration of a portion of a calibration process according to an embodiment.

FIG. 9 shows an illustration of a portion of such a calibration process, where a user 200 stands in two different locations 901 and 902, and in each location positions his or her hand 200a into a position so as to obscure from his or her view, a predetermined location 904 on the display screen 108.

For example, in such a calibration process, the user interface apparatus 100 may cause to be displayed on display screen 108 instructions instructing the user to position his or her hand 200a so as to obscure a given symbol 904 indicated on the display screen, for example located at a corner of the display screen 108, and once in place to perform a "grab-action" i.e. change his or her hand 200a from an open configuration to a closed configuration. Upon determining such an action has occurred, the user interface apparatus 100 may record the eye-hand line 910 in virtual space 702. The user interface apparatus 100 may then cause to be displayed instructions for the user to repeat this process (not shown in FIG. 9 for clarity), whilst the user 200 remains in the same location (for example at location 901), for different symbols on the display screen 108, for example positioned at different corners 908, 912 of the display screen 108. The user interface apparatus 100 may then cause to be displayed instructions for the user to repeat this process, but from a different location, for example location 902, and in such a way determine the dimensions and position in virtual space 702 of the display screen 108, as described in more detail below.

In FIG. 9, the respective resulting two eye-hand lines 910 and 920 (produced when user 200 obscures region 904 from his or her view and performs a grab-action when standing at locations 901 and 902 respectively), have a point of intersection, or near intersection at point 906.

For each location 901 and 902, the user interface apparatus 100, using sensor component 106, determines a representation 704 of the user in three dimensional virtual space 702, and from this determines the eye-hand line (910 or 920) in virtual three dimensional space 702, as described above. Eye-hand line 910 for example may be described in virtual space 702 by an equation in virtual space 702: If E is the eye coordinate and H is the hand coordinate, then the coordinates of any point on the eye-hand line $L_{(E,H)}$ is given by $$L_{(E,H)}: P(t)=E=t(H-E)=E+tu \qquad (1)$$

where t is the equation parameter and u=E−H is the direction vector of $L_{(E,H)}$.

In this case, if the user positions his or her hand 200a to obscure a given region 904 on the screen from two different locations 901 and 902, then the user interface apparatus 100 may determine the corresponding system of eye-hand line equations:

$$L_1: P(t_1)=E_1+t_1 u$$

$$L_2: P(t_2)=E_2+t_2 v \qquad (2)$$

Where v is the corresponding direction vector of $L_2$, and where the subscript "1" refers to the user location 901 and the subscript "2" refers to the user location 902. If the two lines $L_1$ and $L_2$ intersect, they define a unique point P (i.e. intersection point 906) at which they intersect. Such an intersection point can then be used to define the three dimensional coordinates of the region of the display screen 108 in virtual space 702 corresponding to region 904 on display screen 108. In some exemplary calibrations, instead of the user only obscuring one region 904 of the display screen 108 with his or her hand 200a, at each location 901 and 902, the user sequentially obscures two or more regions of the display screen, for example two corners of the display screen 108. In this case, two or more coordinates of the display screen 108 can be determined in virtual space 702. In the example where it is predetermined at the user interface apparatus 100 that the display screen is rectangular, if the calibration process is performed with the regions as three of the four corners of the display screen 108 from two different locations 901 and 902, then the exact dimensions and position of the display screen in virtual space 702 can be determined. This is because if it is predetermined that the screen is rectangular, then the position of the fourth corner of the display screen 108 can be inferred from the positions of the other three corners. If the shape of the display screen 108 is not predetermined, then more regions of the display screen may be included in the calibration process until an appropriate mapping of the position of the display screen to three dimensional virtual space 702 coordinates is achieved.

Figure 10:
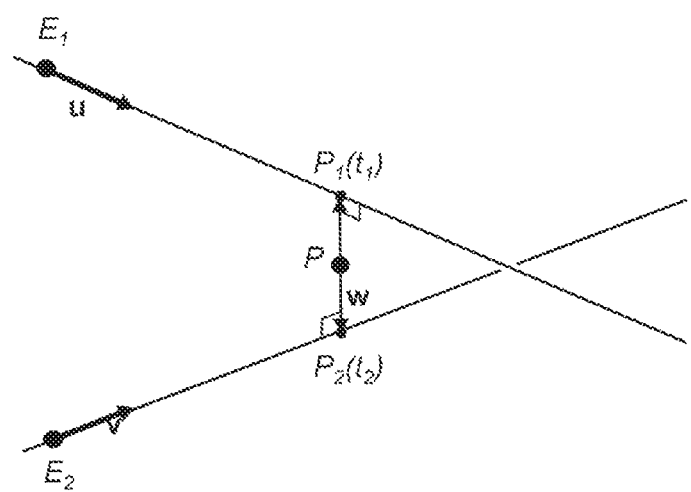
FIG. 10 is a schematic diagram of a near intersection of two straight lines.

In some scenarios, as illustrated in FIG. 10, two eye-hand lines $L_1$ and $L_2$ may not actually intersect, and may only near-intersect. In this case, the intersection point 906 may be determined as the midway of the shortest line connecting $L_1$ and $L_2$. For example, considering the system of equations (2), let $w=P_1(t_1)-P_2(t_2)$ be a vector between point $P_1(t_1)$ on line $L_1$ and point $P_2(t_2)$ on line $L_2$. If the two lines are not parallel, then they are closest at unique points $P_1(t_{1c})$ and $P_2(t_{2c})$: either they intersect and $P_1(t_{1c})=P_2(t_{2c})$, or they only near intersect, and the segment $[P/(t_{1c}), P_2(t_{2c})]$ is the unique segment perpendicular to both lines $L_1$ and $L_2$. In the case of near intersection, the vector $w_c=P_2(t_{2c})-P_1(t_{1c})$ is the unique vector perpendicular to both line direction vectors v and u, that is the vector $w_c$ satisfies the system of equations (3):

$$u \cdot w_c = 0$$

$$v \cdot w_c = 0. \qquad (3)$$

Expressing $w_c$ in terms of u, v, $E_1$ and $E_2$, i.e. $w_c=E_1+t_{1c}u-(E_2+t_{2c}v)$, the system (3) becomes:

$$u \cdot (E_1-E_2)+t_{1c} u \cdot u - t_{2c} u \cdot v = 0$$

$$v \cdot (E_1-E_2)+t_{1c} v \cdot u - t_{2c} v \cdot v = 0. \qquad (4)$$

System (4) can be manipulated to produce equations for the parameters $t_{1c}$ and $t_{2c}$ that define the points $P_1(t_{1c})$ and $P_2(t_{2c})$ respectively, $$t_{1c} = \frac{v \cdot (E_1-E_2) \times u \cdot v - u \cdot (E_1-E_2) \cdot v^2}{u^2 \cdot v^2 - (v \cdot u)^2} \qquad (5)$$

$$t_{2c} = \frac{u \cdot (E_1-E_2) \times u \cdot v - v \cdot (E_1-E_2) \cdot u^2}{(u \cdot v)^2 - v^2 \cdot u^2}$$

The parameters $t_{1c}$ and $t_{2c}$ define the points $P_1(t_{1c})$ and $P_2(t_{2c})$ respectively, which can then be used to define the segment $[P_1(t_{1c}), P_2(t_{2c})]$. The centre of the segment $[P_1(t_{1c}), P_2(t_{2c})]$ can then be used to define the point of near intersection, and hence the position in virtual space 702 of the associated region of the display screen 108.

In such a way, even if the eye-hand lines 910 and 920 of the calibration process only nearly intersect, the position of the region 904 in virtual space 702 can be determined by the user interface apparatus 100.

In some embodiments, the user interface apparatus may determine that the length of the segment $[P_1(t_{1c}), P_2(t_{2c})]$ is above a certain threshold, and hence that the inferred point of near intersection in virtual space is likely to be a poor representation of the corresponding region 904 of the display screen 108. In such cases, the calibration process may be repeated until the length of all segments corresponding to respective near intersection of the calibration process is less than a certain threshold.

In some embodiments, after a first eye-hand line 910 has been recorded for a given region 904 by the user interface apparatus in a step of the calibration process, then when the user 200 is positioning his or her hand to define eye-hand line 920 in a later stage of the calibration process, the display screen displays a dynamic measurement of the shortest distance between lines 910 and 920, so that the user may position his or her hand so as to minimise this measurement, and hence produce a more accurate calibration. Instead of displaying the shortest distance, an indication of whether the shortest distance is within an acceptable range, for example, less than 5 cm, is displayed. This could be represented as a traffic light type system, where is the shortest distance is unacceptable, say >10 cm, the screen displays red, if the shortest distance is acceptable, say <10 cm but >5 cm it displays orange, and is the shortest distance good, say <5 cm, then it displays green.

In some embodiments, the user interface apparatus 100 only records an eye-hand line (e.g. 901, 902) in a calibration process if it is stable enough to provide an suitably accurate determination of screen position, for example only if the corresponding eye and hand positions are stable to within 2 cm for a 10 second period.

It should be noted that once the position of the display screen 108 in virtual space 702 is determined by the user interface apparatus 100, as long as the display screen 108 and sensor component 106 are not moved relative to each other, the user interface apparatus 100 can accurately determine the intersection point 206 with which a user 200 wishes to interact, for any such user, independent of the user's dimensions, body type, etc.

In an exemplary calibration process, the calibration steps described above with reference to region FIGS. 9 and 10 are repeated, for example, for corners 904, 908, and 912 of display screen 108, such that the user interface apparatus 100 determines the three dimensional coordinates (A, B, C) of corners 912, 908, and 904 respectively in virtual space 701. In use, the user interface apparatus 100 may determine a eye-hand line 204 defined in three dimensional virtual space 702 by eye-hand line $L_{(E,H)}$ of equation 1 containing points P(t). In this case, the user interface apparatus 100 may determine the position on the display screen 108 at which the user wishes to interact by calculating the point of intersection P of eye-hand line $L_{(E,H)}$ and the plane (A, B, C) in virtual space 702.

In some embodiments, the 2D coordinates of the point P within the 2D display screen may be calculated, for example for use as an input to an application requiring the 2D coordinates of the point of user interaction on a display screen 108.

In order to express P as such a two dimensional display screen coordinate, the user interface apparatus 100 may calculate the coordinate transformation needed to define A as the origin, AB/|AB| as the x vector, and BC/|BC| as the y vector of the virtual space 702. Such a coordinate transformation may comprise a translation and three rotations as described below. First, the user interface apparatus 100 may define one of the coordinates of the corners, for example A, as an origin O of the virtual space 702. In order to obtain A as the origin of virtual space 702, the translation required from A to the origin O of the virtual space 702 is calculated. Three rotations to compensate for the three possible rotations about this origin the plane (A, B, C) may then be calculated. In a first rotation, an edge of the screen, for example the bottom edge of the screen defined by AB is projected onto the plane (O, x, z) in coordinate system of the virtual space 702, where O is the origin, x is the x axis vector and z is the z axis vector in virtual space 702. The angle α between x and the projection of AB on (O, x, z) may then be calculated using:

$$AB \cdot x = |AB| \cdot |x| \cdot \cos\alpha \Leftrightarrow \alpha = \arccos\left(\frac{|AB \cdot x|}{|AB| \cdot |x|}\right). \quad (6)$$

From equation 6, the rotation—α around the z axis needed to be applied to the plane (A, B, C) to effect the coordinate transformation i.e. to correctly align AB with the x axis of the virtual space coordinate system, can be inferred. The same procedure is then applied for the other axes x and y to infer the corresponding rotations required about those axes accordingly.

The above calculated transformations may then be applied to three dimensional intersection coordinate P in order to transform it to a two dimensional coordinate P' within the display screen.

As described above, once the calibration process has been performed, as long as the relative positions of the display screen 108 and sensor 106 do not change, the same coordinate transformations can be used for different users, independent of user dimensions, body type, etc. and so the calibration need not be repeated.

It will be appreciated that although the above calibration process is described with reference to eye-hand lines, in situations where a head position is being used as the second tracked position, head-hand lines may be used by user interface apparatus 100 in the calibration process instead.

In some embodiments, the user interface apparatus may detect and track multiple users at the same time.

In some embodiments, the user interface apparatus 100 may track the positions of multiple user's and correspondingly determine and carry out interactions with the display screen 108 for each individual user.

In some embodiments, for example where it is desirable that only one user at a time is able to interact with display screen 108, user interface apparatus 100 may determine an "active user", and only obtain and/or use tracking information relating to that user. An active user may be determined for example as the user that is located the shortest distance from the display screen 108, for example based on the determined hip joint location of the virtual representation 704 of each user in virtual space 702.

Figure 11:
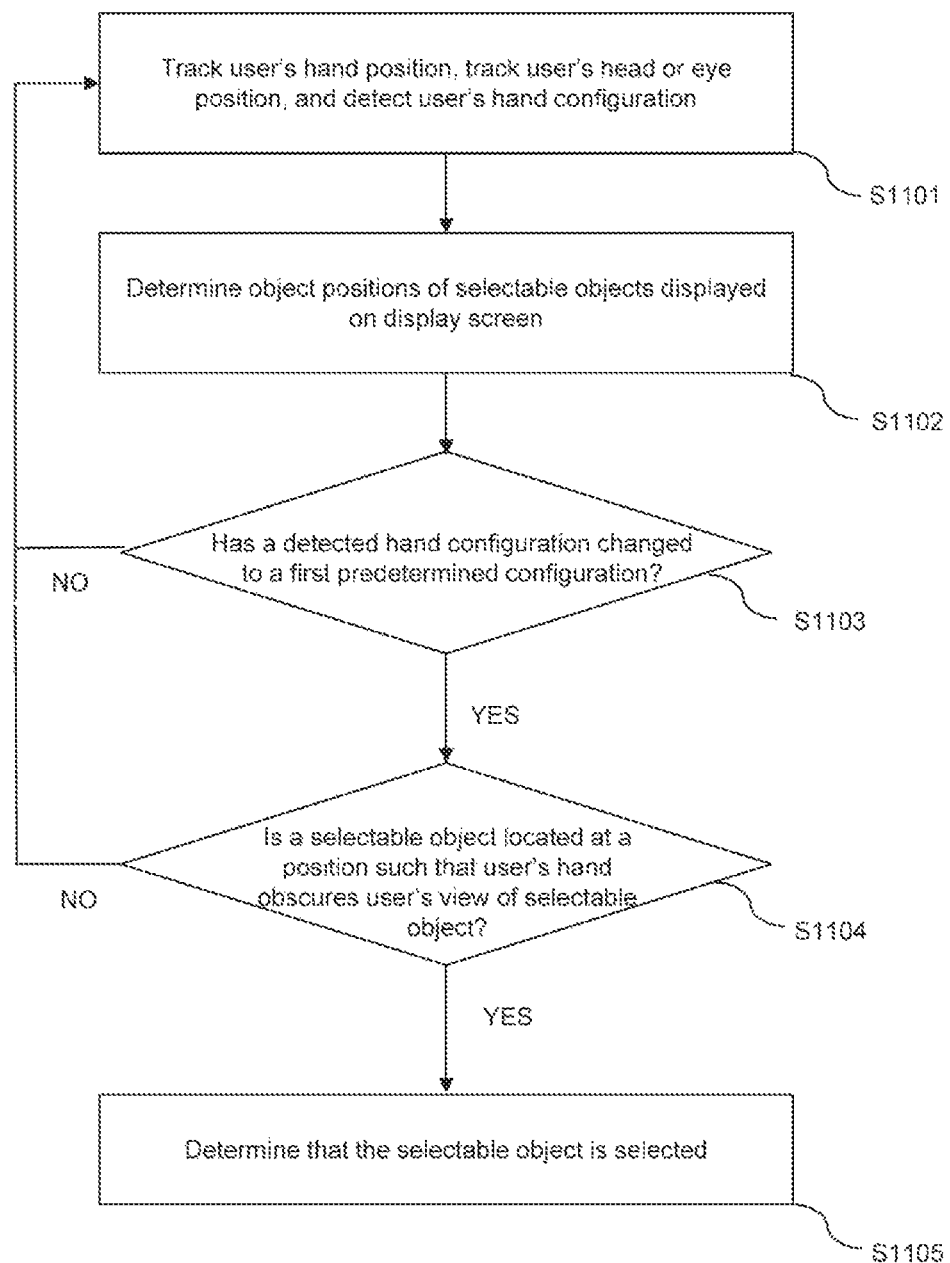
FIG. 11 is a flow diagram showing a method performed by a user interface apparatus according to an embodiment.

FIG. 11 shows a schematic flow diagram of steps in a method performed by a user interface apparatus 100 to allow a user to select selectable objects 108b displayed on a display screen 108 according to an embodiment.

Step S1101 comprises tracking a hand 200a position, the hand position being a position of a first hand 200a of a user, tracking a head 200b or an eye 100c position of the user, and detecting hand configuration of the first hand 200a.

Step S1102 comprises determining one or more object 108b positions of the one or more selectable objects 108b on the display screen 108.

Step S1103 comprises determining when the detected hand configuration of the first hand 200a of the user 200 has changed to a first predetermined configuration, for example to a closed, first like configuration. If the detected hand configuration has changed to a first predetermined configuration, then the method proceeds to step S1104, and if it hasn't then the method returns to step S1101.

Step S1104 comprises determining, responsive to a determination that the detected hand configuration has changed to the first predetermined configuration, and based on the tracked hand 200a position, the tracked head 200b or eye 200c position and the determined one or more object 108b positions, whether a said selectable object 108b is located at a first screen position, the first screen position being a position on the display screen 108 such that the first hand 200a at least partly obscures the user's view of the selectable object 108b. If it is determined that the selectable object is located at the first screen position, then the method progresses to step S1105, and if it is not, the method returns to step S1101. In some embodiments, alternatively, if it is determined that there is no selectable object located at the first screen position, then the user interface apparatus may determine a low competence level of the user, and may for example display a pointer as described above.

Step S1105 comprises, (in the case of a determination that the first hand does at least partly obscure the user's view of the selectable object) determining that the selectable object is selected.

Such a method as described above may be for example, written into code executable by a user interface apparatus 100, or any other suitable processing system, which code may be stored on a computer readable medium, and which when executed by the user interface apparatus 100 or suitable processing system, causes the user interface apparatus 100 or suitable processing system to perform the method as described above.

The above embodiments are to be understood as illustrative examples of the invention. It is to be understood that any feature described in relation to any one embodiment may be used alone, or in combination with other features described, and may also be used in combination with one or more features of any other of the embodiments, or any combination of any other of the embodiments. Furthermore, equivalents and modifications not described above may also be employed without departing from the scope of the invention, which is defined in the accompanying claims.

The invention claimed is:

1. A method performed by at least one computer processor, for use in a user interface apparatus for selecting a selectable object on a display screen, the display screen being arranged to display one or more selectable objects, the method comprising:
    obtaining first information regarding a first tracked position, the first tracked position being a position of a center of a first hand of a user;
    obtaining second information regarding a second tracked position, the second tracked position being a position between the eyes of the user;
    determining one or more object positions of the one or more selectable objects on the display screen;
    determining a first screen position based on a point of the display screen intersected by a straight line passing through both the first tracked position and the second tracked position, the first screen position being a position on the display screen such that the first hand at least partly obscures the user's view of the selectable object;
    in response to a determination that a hand configuration of the first hand has changed to a closed hand configuration, determining, based on the first screen position and the one or more object positions, whether the selectable object is located at the first screen position;
    in the case of a determination that the selectable object is located at the first screen position, determining that the selectable object is selected;
    in response to a determination that the first tracked position has changed while the hand configuration is maintained in the closed hand configuration, controlling the selected selectable object to move on the display screen;
    in response to a determination that the configuration of the first hand has changed from the closed hand configuration to an open hand configuration, determining that the selected selectable object is deselected obtaining information regarding a tracked gaze, the tracked gaze direction being a direction in which the user is looking;
    responsive to a determination that the hand configuration has changed to the open hand configuration, determining a second screen position based on the tracked gaze direction information, the second screen position being a position on the display screen at which the user is looking; and
    responsive to a determination that the second screen position differs by more than a threshold degree from the object position of the selected object, performing a deletion process to delete the selected selectable object.

2. The method according to claim 1, wherein the second tracked position is a position of the centre of the head of the user.

3. The method according to claim 1, the method comprising:
    in response to the determination that the hand configuration has changed to the open hand configuration, controlling the selected selectable object to cease the movement.

4. The method according to claim 1, the method comprising:
    if it is determined that a rate of change of the determined first tracked position is above a given threshold, performing the deletion process to delete the selected selectable object in response to the determination that the hand configuration has changed to the open hand configuration.

5. The method according to claim 1, wherein the first tracked position and the second tracked position are both tracked as three dimensional coordinates.

6. The method according to claim 5, the method comprising a calibration process, the calibration process comprising:
    obtaining third information regarding a third tracked position, the third tracked position being a position of a head or an eye of the user;
    with the user's head or eye positioned in the third tracked position: sequentially determining a first plurality of hand positions such that the first hand at least partly obscures the user's view of a plurality of predefined positions on the display screen, thereby defining a first plurality of straight lines each containing the third tracked position, one of the first plurality of hand positions and a respective one of the predefined position on the display screen;
    obtaining fourth information regarding a fourth tracked position, the fourth tracked position being a position of the head or the eye of the user, different to the third tracked position;
    with the user's head or eye positioned in the fourth tracked position: sequentially determining a second plurality of hand positions such that the first hand at least partly obscures the user's view of each of the plurality of predefined positions on the display screen, thereby defining a second plurality of straight lines each containing the fourth tracked position, one of the second plurality of hand positions, and a respective one of the predefined positions on the display screen; and
    for each of the plurality of predefined positions on the display screen, determining, for a given predefined position, a point of intersection or near intersection of a respective straight line of the first plurality of straight lines with a respective straight line of the second plurality of straight lines and containing the given predefined position.

7. The method according to claim 1, the method comprising:
    responsive to a determination that the detected hand configuration has changed to the closed hand configuration at a determined first screen position at which no said selectable object is located, causing to be displayed, on the display screen, at the determined first screen position, a pointer.

8. The method according to claim 1, the method comprising;
    responsive to a determination that an operation of the user interface has been repeated by the user more than a predetermined number of times, causing to be displayed a pointer on the display screen.

9. The method according to claim 1, wherein the obtaining first information includes tracking the first tracked position with a sensor which is adjacent to the display screen and directed towards the user, and
    the obtaining second information includes tracking the second tracked position with the sensor.

10. A non-transitory computer readable medium having instructions stored thereon a program, when executed by a processing system, cause the processing system to:
- obtain first information regarding a first tracked position, the first tracked position being a position of a center of a first hand of a user;
- obtain second information regarding a second tracked position, the second tracked position being a position between the eyes of the user;
- determine one or more object positions of the one or more selectable objects on the display screen;
- determine a first screen position based on a point of the display screen intersected by a straight line passing through both the first tracked position and the second tracked position, the first screen position being a position on the display screen such that the first hand at least partly obscures the user's view of the selectable object;
- in response to a determination that a hand configuration of the first hand has changed to a closed hand configuration, determine, based on the first screen position and the one or more object positions, whether the selectable object is located at the first screen position;
- in the case of a determination that the selectable object is located at the first screen position, determine that the selectable object is selected;
- in response to a determination that the first tracked position has changed while the hand configuration is maintained in the closed hand configuration, control the selected selectable object to move on the display screen;
- in response to a determination that the configuration of the first hand has changed the closed hand configuration to an open hand configuration, determine that the selected selectable object is deselected;
- obtain information regarding a tracked gaze direction being a direction in which the user is looking;
- responsive to a determination that the hand configuration has changed to the open hand configuration, determining a second screen position based on the tracked gaze direction information, the second screen position being a position on the display screen at which the user is looking; and
- responsive to a determination that the second screen position differs by more than a threshold degree from the object position of the selected object, performing a deletion process to delete the selected selectable object.

11. A user interface apparatus for selecting a selectable object on a display screen, the display screen being arranged to display one or more selectable objects, the user interface apparatus comprising:
- one or more processors configured to:
- obtain first information regarding a first tracked position, the first tracked position being a position of a center of a first hand of user;
- obtain second information regarding a second tracked position, the second tracked position being a position between the eyes of the user;
- determine one or more object positions of the one or more selectable objects on the display screen;
- determine a first screen position based on a point of the display screen intersected by a straight line passing through both the first tracked position and the second tracked position, the first screen position being a position on the display screen such that the first hand at least partly obscures the user's view of the selectable object;
- in response to a determination that a hand configuration of the first hand has changed to a closed hand configuration, determine, based on the first screen position and the one or more object positions, whether the selectable object is located at the first screen position;
- in the case of a determination that the selectable object is located at the first screen position, determine that the selectable object is selected;
- in response to a determination that the first tracked position has changed while the hand configuration is maintained in the closed hand configuration, control the selected selectable object to move on the display screen;
- in response to a determination that the configuration of the first hand has changed from the closed hand configuration to an open hand configuration, that the selected selectable object is deselected;
- obtain information regarding a tracked gaze direction being a direction in which the user is looking;
- responsive to a determination that the hand configuration has changed to the open hand configuration, determining a second screen position based on the tracked gaze direction information, the second screen position being a position on the display screen at which the user is looking; and
- responsive to a determination that the second screen position differs by more than a threshold degree from the object position of the selected object, performing a deletion process to delete the selected selectable object.

* * * * *